(12) United States Patent
Berg et al.

(10) Patent No.: US 12,006,474 B2
(45) Date of Patent: Jun. 11, 2024

(54) METHODS AND APPARATUS FOR TREATING BITUMEN MIXTURES

(71) Applicant: USD Group LLC, Houston, TX (US)

(72) Inventors: Stuart Berg, Houston, TX (US); Amanda Howerton, Houston, TX (US); Mark LeMaire, Houston, TX (US); Robert Nall, Dickinson, TX (US)

(73) Assignee: USD GROUP LLC, Houston, TX (US)

( * ) Notice: Subject to any disclaimer, the term of this patent is extended or adjusted under 35 U.S.C. 154(b) by 202 days.

(21) Appl. No.: 17/589,106

(22) Filed: Jan. 31, 2022

(65) Prior Publication Data

US 2022/0145186 A1    May 12, 2022

Related U.S. Application Data

(63) Continuation of application No. 16/126,976, filed on Sep. 10, 2018, now abandoned, which is a
(Continued)

(51) Int. Cl.
*C10C 3/06* (2006.01)
*C08L 95/00* (2006.01)
(Continued)

(52) U.S. Cl.
CPC ............... *C10C 3/08* (2013.01); *C08L 95/00* (2013.01); *C09D 195/00* (2013.01);
(Continued)

(58) Field of Classification Search
CPC .......... C10C 3/08; C10C 3/002; C10C 3/005; C10C 3/06; C08L 95/00; C09D 195/00; C09J 195/00
See application file for complete search history.

(56) References Cited

U.S. PATENT DOCUMENTS

2002/0170846 A1* 11/2002 Davis .................. C10G 2/00
518/705
2008/0223754 A1* 9/2008 Subramanian ......... C10G 69/04
196/14.52
(Continued)

FOREIGN PATENT DOCUMENTS

CA         2829003 A1 *  4/2014   ............ B61K 11/00

OTHER PUBLICATIONS

Crude by Rail (IHS Energy), Dec. 2014, IHS.com, pp. 1-26. (Year: 2014).*
(Continued)

*Primary Examiner* — Michelle Stein
(74) *Attorney, Agent, or Firm* — HAYNES AND BOONE, LLP

(57) ABSTRACT

Disclosed are methods for preparing a high-viscosity non-hazardous bitumen composition for transportation in a railcar, wherein the method may include: (a) providing to a fractionator system a low-viscosity bitumen composition previously residing in a pipeline having a first viscosity and comprising a miscible blend of hydrocarbons, which blend was prepared by mixing a first diluent composition with a first bitumen composition; (b) heating the low-viscosity bitumen composition in the fractionator system at an operating temperature of from 170 C to 232 C to provide a first light fraction and a first heavy fraction; (c) removing at least a portion of the first heavy fraction from the fractionator system, wherein the first heavy fraction has a second viscosity that is higher than the first viscosity; (d) forming a high-viscosity non-hazardous bitumen composition from at least a portion of the first heavy fraction; and (e) directing the high-viscosity non-hazardous bitumen composition to a railcar.

14 Claims, 27 Drawing Sheets

Related U.S. Application Data continuation-in-part of application No. 15/782,724, filed on Oct. 12, 2017, now abandoned.

(60) Provisional application No. 62/414,237, filed on Oct. 28, 2016.

(51) Int. Cl.
*C09D 195/00* (2006.01)
*C09J 195/00* (2006.01)
*C10C 3/00* (2006.01)
*C10C 3/08* (2006.01)

(52) U.S. Cl.
CPC ............. *C09J 195/00* (2013.01); *C10C 3/002* (2013.01); *C10C 3/005* (2013.01); *C10C 3/06* (2013.01)

(56) References Cited

U.S. PATENT DOCUMENTS

| | | | | |
|---|---|---|---|---|
| 2009/0292571 | A1* | 11/2009 | Gil | G06Q 10/0637 208/100 |
| 2010/0122641 | A1* | 5/2010 | Molaro | B61D 5/00 105/358 |
| 2014/0193761 | A1* | 7/2014 | Donnelly | B61C 17/08 165/200 |
| 2014/0318629 | A1* | 10/2014 | Gieskes | B61D 5/008 137/234.6 |
| 2015/0203768 | A1* | 7/2015 | Coppola | C10G 55/04 208/93 |
| 2015/0267128 | A1* | 9/2015 | Jarlsjo | C10G 1/02 208/263 |
| 2015/0315385 | A1* | 11/2015 | Wagner | C08K 5/17 585/13 |
| 2018/0010057 | A1* | 1/2018 | Coppola | C10G 27/00 |

OTHER PUBLICATIONS

Paengjuntuek, Heat Recovery from Process to Process Exchanger by Using Bypass Control, 2009, World Applied Sciences Journal 6 (7): 1008-1016. (Year: 2009).*

* cited by examiner

Heat and Material Balance
235° F Flash Point w/Stabilizer

| | Unit | Cold Lake Sim | Water in Dilbit | Column Feed | Stripping Steam | Heavy | Heavy to Storage | Heavy Product | To Condenser |
|---|---|---|---|---|---|---|---|---|---|
| Vapour Fraction | | 0.00 | 0.00 | 0.46 | 1.00 | 0.00 | 0.00 | 0.00 | 1.00 |
| Temperature | F | 60 | 60 | 400 | 550 | 390 | 250 | 212 | 211 |
| Pressure | psia | 15 | 265 | 65 | 62 | 29 | 115 | 65 | 26 |
| Molar Flow | lbmole/hr | 2,475 | 159 | 2,634 | 56 | 1,262 | 1,262 | 1,262 | 2,262 |
| Mass Flow | lb/hr | 670,467 | 2,856 | 673,323 | 1,000 | 571,745 | 571,745 | 571,745 | 173,863 |
| Liquid Volume Flow | barrel/day | 50,000 | 196 | 50,196 | 69 | 39,784 | 39,784 | 39,784 | 17,695 |
| Specific Gravity | | 0.92 | 1.01 | --- | --- | 0.84 | 0.89 | 0.90 | --- |
| Kinematic Viscosity | cSt | 195.72 | 1.10 | --- | 11.81 | 3.67 | 20.99 | 41.18 | 1.76 |
| Viscosity | cP | 179.62 | 1.12 | --- | 0.02 | 3.07 | 18.62 | 37.06 | 0.01 |

| | Unit | To AE-101 | To V-101 | Reflux | Diluent to Stabilizer | Recovered Water 1 | Fuel Gas from V-101 | Condensed FG to Stabilizer | Recovered Water 2 |
|---|---|---|---|---|---|---|---|---|---|
| Vapour Fraction | | 0.42 | 0.23 | 0.00 | 0.00 | 0.00 | 1.00 | 0.00 | 0.00 |
| Temperature | F | 145 | 133 | 133 | 133 | 133 | 133 | 121 | 120 |
| Pressure | psia | 22 | 20 | 135 | 135 | 65 | 20 | 125 | 43 |
| Molar Flow | lbmole/hr | 2,262 | 2,262 | 835 | 757 | 143 | 532 | 470 | 62 |
| Mass Flow | lb/hr | 173,863 | 173,863 | 71,278 | 64,606 | 2,577 | 35,740 | 34,618 | 1,123 |
| Liquid Volume Flow | barrel/day | 17,695 | 17,695 | 7,214 | 6,539 | 177 | 3,800 | 3,723 | 77 |
| Specific Gravity | | --- | --- | 0.64 | 0.64 | 0.98 | --- | 0.61 | 0.99 |
| Kinematic Viscosity | cSt | --- | --- | 0.38 | 0.38 | 0.50 | --- | 0.32 | 0.56 |
| Viscosity | cP | --- | --- | 0.24 | 0.24 | 0.49 | --- | 0.19 | 0.55 |

| | Unit | Off Gas for Fuel | LPG | Stabilized Diluent | Stab Recovered Water |
|---|---|---|---|---|---|
| Vapour Fraction | | 1.00 | 0.00 | 0.00 | 0.00 |
| Temperature | F | 142 | 142 | 259 | 142 |
| Pressure | psia | 95 | 95 | 104 | 95 |
| Molar Flow | lbmole/hr | 87 | 0 | 1,140 | 0 |
| Mass Flow | lb/hr | 4,999 | 0 | 94,224 | 0 |
| Liquid Volume Flow | barrel/day | 588 | 0 | 9,674 | 0 |
| Specific Gravity | | --- | 0.53 | 0.55 | 0.53 |
| Kinematic Viscosity | cSt | 0.54 | 0.24 | 0.23 | 0.24 |
| Viscosity | cP | 0.01 | 0.13 | 0.13 | 0.13 |

FIG. 6A

Stream Compositions
235° F Flash Point w/Stabilizer

| | Unit | Cold Lake Sim | Diluent to Stabilizer | Condensed FG to Stabilizer | Heavy Product | Stabilized Diluent | Off Gas for Fuel |
|---|---|---|---|---|---|---|---|
| Comp Mole Frac (Methane) | | 0 | 0 | 0 | 0 | 0 | 0 |
| Comp Mole Frac (Ethane) | | 0 | 0 | 0 | 0 | 0 | 0 |
| Comp Mole Frac (Propane) | | 0.001229 | 0.000438 | 0.005772 | 0 | 0 | 0.035185 |
| Comp Mole Frac (i-Butane) | | 0.006991 | 0.00495 | 0.028891 | 0.000012 | 0.000246 | 0.197009 |
| Comp Mole Frac (n-Butane) | | 0.026566 | 0.023541 | 0.102135 | 0.000077 | 0.007126 | 0.666845 |
| Comp Mole Frac (i-Pentane) | | 0.116767 | 0.172504 | 0.335269 | 0.001417 | 0.247569 | 0.067324 |
| Comp Mole Frac (n-Pentane) | | 0.119771 | 0.199399 | 0.306505 | 0.001927 | 0.257904 | 0.010137 |
| Comp Mole Frac (n-Hexane) | | 0.104362 | 0.246232 | 0.137789 | 0.006322 | 0.220218 | 0.000001 |
| Comp Mole Frac (n-Heptane) | | 0.038118 | 0.101582 | 0.021696 | 0.005954 | 0.076363 | 0 |
| Comp Mole Frac (n-Octane) | | 0.021106 | 0.055127 | 0.004538 | 0.006734 | 0.038459 | 0 |
| Comp Mole Frac (n-Nonane) | | 0.013729 | 0.031179 | 0.001025 | 0.007893 | 0.021116 | 0 |
| Comp Mole Frac (n-Decane) | | 0.013137 | 0.007225 | 0.000098 | 0.021404 | 0.004836 | 0 |
| Comp Mole Frac (Mcyclopentan) | | 0.018669 | 0.044401 | 0.0233 | 0.001419 | 0.039073 | 0 |
| Comp Mole Frac (Benzene) | | 0.005896 | 0.013961 | 0.007381 | 0.000476 | 0.012308 | 0 |
| Comp Mole Frac (Cyclohexane) | | 0.011588 | 0.028506 | 0.012149 | 0.001172 | 0.023927 | 0 |
| Comp Mole Frac (Mcyclohexane) | | 0.014622 | 0.038051 | 0.008378 | 0.002811 | 0.028708 | 0 |
| Comp Mole Frac (Toluene) | | 0.006174 | 0.01625 | 0.002917 | 0.001307 | 0.011987 | 0 |
| Comp Mole Frac (E-Benzene) | | 0.000765 | 0.001905 | 0.000132 | 0.000313 | 0.001319 | 0 |
| Comp Mole Frac (p-Xylene) | | 0.001531 | 0.003769 | 0.000228 | 0.000663 | 0.002596 | 0 |
| Comp Mole Frac (m-Xylene) | | 0.001276 | 0.003142 | 0.000189 | 0.000552 | 0.002163 | 0 |
| Comp Mole Frac (o-Xylene) | | 0.001021 | 0.002458 | 0.000138 | 0.00048 | 0.001688 | 0 |
| Comp Mole Frac (124-MBenzene) | | 0.002254 | 0.003561 | 0.000069 | 0.002264 | 0.002392 | 0 |
| Comp Mole Frac (H2O) | | 0 | 0.001816 | 0.001401 | 0.006416 | 0 | 0.023498 |
| Comp Mole Frac (NBP[2]395*) | | 0.005426 | 0.000002 | 0 | 0.01064 | 0.000001 | 0 |
| Comp Mole Frac (NBP[2]421*) | | 0.010049 | 0 | 0 | 0.019707 | 0 | 0 |
| Comp Mole Frac (NBP[2]446*) | | 0.013842 | 0 | 0 | 0.027144 | 0 | 0 |
| Comp Mole Frac (NBP[2]472*) | | 0.015771 | 0 | 0 | 0.030927 | 0 | 0 |
| Comp Mole Frac (NBP[2]498*) | | 0.016575 | 0 | 0 | 0.032504 | 0 | 0 |
| Comp Mole Frac (NBP[2]525*) | | 0.016836 | 0 | 0 | 0.033016 | 0 | 0 |
| Comp Mole Frac (NBP[2]551*) | | 0.017127 | 0 | 0 | 0.033587 | 0 | 0 |
| Comp Mole Frac (NBP[2]575*) | | 0.014987 | 0 | 0 | 0.02939 | 0 | 0 |
| Comp Mole Frac (NBP[2]605*) | | 0.012899 | 0 | 0 | 0.025295 | 0 | 0 |
| Comp Mole Frac (NBP[2]631*) | | 0.017502 | 0 | 0 | 0.034322 | 0 | 0 |
| Comp Mole Frac (NBP[2]656*) | | 0.016847 | 0 | 0 | 0.033039 | 0 | 0 |
| Comp Mole Frac (NBP[2]682*) | | 0.016305 | 0 | 0 | 0.031975 | 0 | 0 |
| Comp Mole Frac (NBP[2]708*) | | 0.015211 | 0 | 0 | 0.02983 | 0 | 0 |
| Comp Mole Frac (NBP[2]735*) | | 0.014395 | 0 | 0 | 0.02823 | 0 | 0 |
| Comp Mole Frac (NBP[2]762*) | | 0.015006 | 0 | 0 | 0.029428 | 0 | 0 |
| Comp Mole Frac (NBP[2]788*) | | 0.015548 | 0 | 0 | 0.030491 | 0 | 0 |
| Comp Mole Frac (NBP[2]824*) | | 0.025133 | 0 | 0 | 0.049287 | 0 | 0 |
| Comp Mole Frac (NBP[2]876*) | | 0.020632 | 0 | 0 | 0.04046 | 0 | 0 |
| Comp Mole Frac (NBP[2]925*) | | 0.019206 | 0 | 0 | 0.037664 | 0 | 0 |
| Comp Mole Frac (NBP[2]975*) | | 0.01694 | 0 | 0 | 0.03322 | 0 | 0 |
| Comp Mole Frac (NBP[2]1025*) | | 0.015074 | 0 | 0 | 0.029561 | 0 | 0 |
| Comp Mole Frac (NBP[2]1075*) | | 0.013981 | 0 | 0 | 0.027417 | 0 | 0 |
| Comp Mole Frac (NBP[2]1125*) | | 0.012584 | 0 | 0 | 0.024678 | 0 | 0 |
| Comp Mole Frac (NBP[2]1175*) | | 0.011573 | 0 | 0 | 0.022696 | 0 | 0 |
| Comp Mole Frac (NBP[2]1253*) | | 0.022882 | 0 | 0 | 0.044873 | 0 | 0 |
| Comp Mole Frac (NBP[2]1348*) | | 0.028385 | 0 | 0 | 0.055664 | 0 | 0 |
| Comp Mole Frac (NBP[2]1438*) | | 0.020641 | 0 | 0 | 0.040478 | 0 | 0 |
| Comp Mole Frac (NBP[2]1539*) | | 0.01454 | 0 | 0 | 0.028514 | 0 | 0 |
| Comp Mole Frac (NBP[2]1634*) | | 0.008455 | 0 | 0 | 0.016581 | 0 | 0 |
| Comp Mole Frac (NBP[2]1730*) | | 0.00518 | 0 | 0 | 0.010158 | 0 | 0 |
| Comp Mole Frac (NBP[2]1833*) | | 0.002654 | 0 | 0 | 0.005206 | 0 | 0 |
| Comp Mole Frac (NBP[2]1937*) | | 0.002243 | 0 | 0 | 0.004399 | 0 | 0 |
| Comp Mole Frac (NBP[3]423*) | | 0 | 0 | 0 | 0 | 0 | 0 |
| Comp Mole Frac (NBP[3]452*) | | 0 | 0 | 0 | 0 | 0 | 0 |
| Comp Mole Frac (NBP[3]473*) | | 0 | 0 | 0 | 0 | 0 | 0 |
| Comp Mole Frac (NBP[3]500*) | | 0 | 0 | 0 | 0 | 0 | 0 |

FIG. 6B1

Stream Compositions
235° F Flash Point w/Stabilizer

|  | Unit | Cold Lake Sim | Diluent to Stabilizer | Condensed FG to Stabilizer | Heavy Product | Stabilized Diluent | Off Gas for Fuel |
|---|---|---|---|---|---|---|---|
| Comp Mole Frac (NBP[3]526*) |  | 0 | 0 | 0 | 0 | 0 | 0 |
| Comp Mole Frac (NBP[3]552*) |  | 0 | 0 | 0 | 0 | 0 | 0 |
| Comp Mole Frac (NBP[3]579*) |  | 0 | 0 | 0 | 0 | 0 | 0 |
| Comp Mole Frac (NBP[3]605*) |  | 0 | 0 | 0 | 0 | 0 | 0 |
| Comp Mole Frac (NBP[3]630*) |  | 0 | 0 | 0 | 0 | 0 | 0 |
| Comp Mole Frac (NBP[3]658*) |  | 0 | 0 | 0 | 0 | 0 | 0 |
| Comp Mole Frac (NBP[3]683*) |  | 0 | 0 | 0 | 0 | 0 | 0 |
| Comp Mole Frac (NBP[3]709*) |  | 0 | 0 | 0 | 0 | 0 | 0 |
| Comp Mole Frac (NBP[3]735*) |  | 0 | 0 | 0 | 0 | 0 | 0 |
| Comp Mole Frac (NBP[3]762*) |  | 0 | 0 | 0 | 0 | 0 | 0 |
| Comp Mole Frac (NBP[3]788*) |  | 0 | 0 | 0 | 0 | 0 | 0 |
| Comp Mole Frac (NBP[3]825*) |  | 0 | 0 | 0 | 0 | 0 | 0 |
| Comp Mole Frac (NBP[3]875*) |  | 0 | 0 | 0 | 0 | 0 | 0 |
| Comp Mole Frac (NBP[3]925*) |  | 0 | 0 | 0 | 0 | 0 | 0 |
| Comp Mole Frac (NBP[3]975*) |  | 0 | 0 | 0 | 0 | 0 | 0 |
| Comp Mole Frac (NBP[3]1025*) |  | 0 | 0 | 0 | 0 | 0 | 0 |
| Comp Mole Frac (NBP[3]1075*) |  | 0 | 0 | 0 | 0 | 0 | 0 |
| Comp Mole Frac (NBP[3]1125*) |  | 0 | 0 | 0 | 0 | 0 | 0 |
| Comp Mole Frac (NBP[3]1175*) |  | 0 | 0 | 0 | 0 | 0 | 0 |
| Comp Mole Frac (NBP[3]1251*) |  | 0 | 0 | 0 | 0 | 0 | 0 |
| Comp Mole Frac (NBP[3]1338*) |  | 0 | 0 | 0 | 0 | 0 | 0 |
| Comp Mole Frac (NBP[3]1436*) |  | 0 | 0 | 0 | 0 | 0 | 0 |
| Comp Mole Frac (NBP[3]1530*) |  | 0 | 0 | 0 | 0 | 0 | 0 |
| Comp Mole Frac (NBP[3]1626*) |  | 0 | 0 | 0 | 0 | 0 | 0 |

FIG. 6B2

235° F Flash Point w/Stabilizer

| | | |
|---|---|---|
| | Case Name: | (4 overhead exchangers Tray 11, 235 FP w_stabilizer).hsc |

| Stream: | Heavy Product | Boiling Point Curves: Boiling Point Curves-Dru |
|---|---|---|

BOILING POINT CURVES

| Basis | Stream |
|---|---|
| Liquid Volume | Heavy Product |

RESULTS

BP Curves Results

| Cut Point (%) | TBP (F) | ASTM D86 (F) | D86 Crack Reduced (F) | ASTM D1160(Vac) (F) | ASTM D1160(Atm) (F) | ASTM D2887 (F) |
|---|---|---|---|---|---|---|
| 0.00 | 210.47 | 298.37 | 298.37 | 27.97 | 210.47 | 212.00 |
| 1.00 | 291.53 | 348.59 | 348.59 | 91.25 | 291.50 | 259.14 |
| 2.00 | 362.05 | 396.95 | 396.95 | 147.20 | 362.09 | 300.03 |
| 3.50 | 431.86 | 447.80 | 447.80 | 203.25 | 431.85 | 350.88 |
| 5.00 | 481.88 | 470.69 | 470.69 | 227.62 | 481.87 | 390.84 |
| 7.50 | 502.12 | 502.12 | 496.27 | 260.50 | 502.12 | 438.43 |
| 10.00 | 538.17 | 530.97 | 523.12 | 290.19 | 538.17 | 469.91 |
| 12.50 | 570.43 | 557.28 | 547.08 | 316.93 | 570.43 | 495.18 |
| 15.00 | 610.67 | 590.68 | 576.61 | 350.53 | 610.66 | 526.39 |
| 17.50 | 641.02 | 616.26 | 598.46 | 376.06 | 641.02 | 556.29 |
| 20.00 | 668.14 | 639.37 | 617.39 | 399.00 | 668.14 | 582.57 |
| 25.00 | 724.48 | 686.02 | 654.91 | 447.07 | 724.48 | 631.90 |
| 30.00 | 779.37 | 735.83 | 686.18 | 494.42 | 779.37 | 682.38 |
| 35.00 | 830.01 | 779.65 | 715.47 | 538.59 | 830.01 | 733.15 |
| 40.00 | 889.56 | 831.40 | 743.87 | 591.12 | 889.56 | 784.55 |
| 45.00 | 951.25 | 885.61 | 769.63 | 646.22 | 951.24 | 840.05 |
| 50.00 | 1017.66 | 944.94 | 793.83 | 706.34 | 1017.66 | 902.15 |
| 55.00 | 1087.92 | 1009.31 | 816.26 | 770.86 | 1087.92 | 969.41 |
| 60.00 | 1161.77 | 1077.99 | 836.72 | 839.72 | 1161.77 | 1041.52 |
| 65.00 | 1238.18 | 1149.45 | 855.23 | 912.12 | 1238.19 | 1116.11 |
| 70.00 | 1301.61 | 1210.27 | 869.25 | 973.05 | 1301.55 | 1190.87 |
| 75.00 | 1354.26 | 1262.39 | 879.69 | 1024.36 | 1354.23 | 1255.88 |
| 80.00 | 1405.06 | 1313.55 | 887.33 | 1074.33 | 1404.97 | 1311.88 |
| 85.00 | 1467.21 | 1375.40 | 893.55 | 1136.34 | 1467.16 | 1384.00 |
| 90.00 | 1548.85 | 1441.26 | 900.12 | 1219.04 | 1548.79 | 1472.26 |
| 92.50 | 1597.99 | 1466.81 | 903.18 | 1269.50 | 1597.86 | 1517.56 |
| 95.00 | 1661.69 | 1507.78 | 910.65 | 1345.00 | 1670.35 | 1550.06 |
| 96.50 | 1717.28 | 1543.45 | 923.90 | 1394.50 | 1717.22 | 1630.58 |
| 98.00 | 1808.36 | 1592.04 | 946.39 | 1492.39 | 1808.49 | 1721.50 |
| 99.00 | 1851.61 | 1606.85 | 951.14 | 1539.44 | 1851.88 | 1745.99 |
| 100.00 | 1884.31 | 1613.14 | 952.89 | 1575.30 | 1884.31 | 1761.86 |

COLD PROPERTIES

| True VP at 37.8 C | (psia) | --- | Cetane Index | | --- |
|---|---|---|---|---|---|
| Reid VP at 37.8 C | (psia) | --- | Research Octane Number | | --- |
| ASTM D93 Flash Point | (F) | 236.7295 | Viscosity at 37.8 C | (cP) | 2217.65731 |
| ASTM D97 Pour Point | (F) | 75.3829 | Viscosity at 97.8 C | (cP) | 38.63362 |
| Refractive Index | | 1.5283 | | | |

P:N:A

| Paraffins [mol%] | 93.3260 | Naphthas [mol%] | 6.6740 | Aromatics [mol%] | 0.0000 |
|---|---|---|---|---|---|

FIG. 6C

235° F Flash Point w/Stabilizer

| | | |
|---|---|---|
| | Case Name: | (4 overhead exchangers Tray 11, 235 FP w_stabilizer).hsc |
| | | |

| Stream: Stabilized Diluent | Boiling Point Curves: Boiling Point Curves-Sta |
|---|---|

BOILING POINT CURVES

| Basis | Stream |
|---|---|
| Liquid Volume | Stabilized Diluent |

RESULTS

BP Curves Results

| Cut Point (%) | TBP (F) | ASTM D86 (F) | D86 Crack Reduced (F) | ASTM D1160(Vac) (F) | ASTM D1160(Atm) (F) | ASTM D2887 (F) |
|---|---|---|---|---|---|---|
| 0.00 | 51.43 | 97.69 | 97.69 | -75.01 | 75.83 | 45.48 |
| 1.00 | 53.96 | 98.93 | 98.93 | -74.03 | 77.12 | 48.70 |
| 2.00 | 58.49 | 100.16 | 100.16 | -73.06 | 78.41 | 51.45 |
| 3.50 | 60.28 | 102.02 | 102.02 | -70.41 | 81.92 | 55.05 |
| 5.00 | 64.07 | 105.74 | 105.74 | -68.77 | 84.09 | 58.49 |
| 7.50 | 73.61 | 108.72 | 108.72 | -66.43 | 87.18 | 67.15 |
| 10.00 | 78.75 | 111.10 | 111.10 | -64.52 | 89.70 | 78.17 |
| 12.50 | 82.39 | 112.85 | 112.85 | -62.97 | 91.75 | 85.87 |
| 15.00 | 83.96 | 113.67 | 113.67 | -61.71 | 93.41 | 91.03 |
| 17.50 | 85.53 | 114.49 | 114.49 | -60.68 | 94.77 | 94.11 |
| 20.00 | 87.10 | 116.30 | 116.30 | -59.81 | 95.92 | 96.86 |
| 25.00 | 92.13 | 117.46 | 117.46 | -58.26 | 97.97 | 102.11 |
| 30.00 | 93.97 | 118.53 | 118.53 | -56.52 | 100.26 | 108.01 |
| 35.00 | 96.47 | 120.17 | 120.17 | -54.04 | 103.53 | 113.69 |
| 40.00 | 108.19 | 127.39 | 127.39 | -46.13 | 113.94 | 119.46 |
| 45.00 | 122.00 | 135.93 | 135.93 | -38.92 | 126.03 | 128.32 |
| 50.00 | 135.55 | 144.35 | 144.35 | -27.84 | 137.92 | 141.80 |
| 55.00 | 147.66 | 151.90 | 151.90 | -19.70 | 148.57 | 155.01 |
| 60.00 | 156.07 | 157.18 | 157.18 | -13.96 | 156.07 | 164.92 |
| 65.00 | 158.15 | 158.53 | 158.53 | -12.36 | 158.15 | 171.24 |
| 70.00 | 160.23 | 159.87 | 159.87 | -10.76 | 160.23 | 173.18 |
| 75.00 | 176.42 | 171.74 | 171.74 | 1.68 | 176.42 | 180.57 |
| 80.00 | 197.94 | 194.41 | 194.41 | 18.30 | 197.96 | 200.17 |
| 85.00 | 211.67 | 202.78 | 202.78 | 28.91 | 211.67 | 219.47 |
| 90.00 | 234.48 | 224.38 | 224.38 | 46.62 | 234.48 | 234.69 |
| 92.50 | 256.83 | 245.80 | 245.80 | 64.05 | 256.83 | 250.24 |
| 95.00 | 272.99 | 260.98 | 260.98 | 76.71 | 272.98 | 272.50 |
| 96.50 | 296.56 | 281.84 | 281.64 | 95.24 | 296.57 | 291.77 |
| 98.00 | 307.79 | 290.60 | 290.60 | 104.10 | 307.80 | 313.46 |
| 99.00 | 315.79 | 296.58 | 296.58 | 110.43 | 315.80 | 325.46 |
| 100.00 | 323.80 | 302.56 | 302.56 | 118.75 | 323.80 | 333.81 |

COLD PROPERTIES

| True VP at 37.8 C | (psia) | --- | Cetane Index | | --- |
|---|---|---|---|---|---|
| Reid VP at 37.8 C | (psia) | --- | Research Octane Number | | 65.3825 |
| ASTM D93 Flash Point | (F) | -80.0983 | Viscosity at 37.8 C | (cP) | 0.26814 |
| ASTM D97 Pour Point | (F) | --- | Viscosity at 97.8 C | (cP) | 0.15796 |
| Refractive Index | | 1.3757 | | | |

P:N:A

| Paraffins [mol%] | 82.6486 | Naphthas [mol%] | 17.3263 | Aromatics [mol%] | 0.0250 |
|---|---|---|---|---|---|

FIG. 6D

235° F Flash Point w/Stabilizer

| | | |
|---|---|---|
| | Case Name: | (4 overhead exchangers Tray 11, 235 FP w_stabilizer).hsc |

| Stream: | Off Gas for Fuel | Boiling Point Curves: | Boiling Point Curves-Off |
|---|---|---|---|

BOILING POINT CURVES

| Basis | Stream |
|---|---|
| Liquid Volume | Off Gas for Fuel |

RESULTS

BP Curves Results

| Cut Point (%) | TBP (F) | ASTM D86 (F) | D86 Crack Reduced (F) | ASTM D1160(Vac) (F) | ASTM D1160(Atm) (F) | ASTM D2887 (F) |
|---|---|---|---|---|---|---|
| 0.00 | -52.47 | -4.53 | -4.53 | -148.63 | -22.59 | -54.88 |
| 1.00 | -46.82 | -0.06 | -0.06 | -146.57 | -19.81 | -45.98 |
| 2.00 | -41.32 | 3.18 | 3.18 | -144.51 | -17.04 | -39.28 |
| 3.50 | -33.35 | 6.34 | 6.34 | -141.44 | -12.90 | -32.37 |
| 5.00 | -25.71 | 14.37 | 14.37 | -138.38 | -8.79 | -27.81 |
| 7.50 | -13.73 | 20.68 | 20.68 | -133.37 | -2.04 | -17.98 |
| 10.00 | -2.67 | 24.89 | 24.89 | -128.47 | 4.55 | -6.05 |
| 12.50 | 7.45 | 27.01 | 27.01 | -123.73 | 10.91 | 5.18 |
| 15.00 | 11.62 | 27.67 | 27.67 | -121.58 | 13.79 | 14.43 |
| 17.50 | 12.77 | 28.31 | 28.31 | -120.82 | 14.80 | 18.81 |
| 20.00 | 13.92 | 28.96 | 28.96 | -120.07 | 15.81 | 21.44 |
| 25.00 | 16.22 | 30.24 | 30.24 | -118.56 | 17.83 | 24.40 |
| 30.00 | 18.52 | 31.53 | 31.53 | -117.05 | 19.85 | 28.50 |
| 35.00 | 20.82 | 32.81 | 32.81 | -115.54 | 21.87 | 33.39 |
| 40.00 | 23.12 | 34.10 | 34.10 | -114.04 | 23.88 | 38.23 |
| 45.00 | 25.42 | 35.38 | 35.38 | -112.53 | 25.90 | 40.95 |
| 50.00 | 27.72 | 36.67 | 36.67 | -111.02 | 27.91 | 42.48 |
| 55.00 | 30.03 | 37.15 | 37.15 | -109.51 | 29.93 | 45.29 |
| 60.00 | 34.73 | 41.05 | 41.05 | -108.75 | 33.63 | 49.59 |
| 65.00 | 41.53 | 45.72 | 45.72 | -102.56 | 39.21 | 55.10 |
| 70.00 | 48.33 | 50.40 | 50.40 | -97.98 | 45.32 | 61.22 |
| 75.00 | 52.07 | 55.08 | 55.08 | -93.03 | 51.91 | 66.93 |
| 80.00 | 59.05 | 59.75 | 59.75 | -87.74 | 58.94 | 71.59 |
| 85.00 | 66.45 | 61.80 | 61.80 | -82.13 | 66.39 | 77.68 |
| 90.00 | 74.24 | 67.56 | 67.56 | -76.23 | 74.21 | 83.39 |
| 92.50 | 78.26 | 70.62 | 70.62 | -73.18 | 76.25 | 84.62 |
| 95.00 | 82.37 | 73.82 | 73.82 | -70.06 | 82.37 | 85.24 |
| 96.50 | 84.88 | 75.81 | 75.81 | -68.17 | 84.88 | 85.83 |
| 98.00 | 87.42 | 77.84 | 77.84 | -66.25 | 87.42 | 86.09 |
| 99.00 | 89.12 | 79.22 | 79.22 | -64.96 | 89.12 | 86.42 |
| 100.00 | 90.84 | 80.62 | 80.62 | -63.66 | 90.84 | 86.77 |

COLD PROPERTIES

| True VP at 37.8 C | (psia) | --- | Cetane Index | | --- |
|---|---|---|---|---|---|
| Reid VP at 37.8 C | (psia) | --- | Research Octane Number | | --- |
| ASTM D93 Flash Point | (F) | --- | Viscosity at 37.8 C | (cP) | 0.15136 |
| ASTM D97 Pour Point | (F) | --- | Viscosity at 97.8 C | (cP) | 0.08821 |
| Refractive Index | | 1.3342 | | | |

P:N:A

| Paraffins [mol%] | --- | Naphthas [mol%] | --- | Aromatics [mol%] | --- |
|---|---|---|---|---|---|

FIG. 6E

Heat and Material Balance
235° F Flash Point

| | Unit | Cold Lake Sim | Water in Dilbit | Column Feed | Stripping Steam | Heavy | Heavy to Storage | Heavy Product | To Condenser | To AE-101 | To V-101 | Reflux |
|---|---|---|---|---|---|---|---|---|---|---|---|---|
| Vapour Fraction | | 0.00 | 0.00 | 0.46 | 1.00 | 0.00 | 0.00 | 0.00 | 1.00 | 0.42 | 0.23 | 0.00 |
| Temperature | F | 60 | 60 | 400 | 550 | 390 | 250 | 212 | 211 | 145 | 133 | 133 |
| Pressure | psia | 15 | 265 | 65 | 62 | 29 | 115 | 65 | 26 | 22 | 20 | 115 |
| Molar Flow | lbmole/hr | 2,475 | 159 | 2,634 | 56 | 1,262 | 1,262 | 1,262 | 2,262 | 2,262 | 2,262 | 835 |
| Mass Flow | lb/hr | 670,467 | 2,856 | 673,323 | 1,000 | 571,745 | 571,745 | 571,745 | 173,863 | 173,863 | 173,863 | 71,278 |
| Liquid Volume Flow | barrel/day | 50,000 | 196 | 50,196 | 69 | 39,784 | 39,784 | 39,784 | 17,695 | 17,695 | 17,695 | 7,214 |
| Specific Gravity | | 0.92 | 1.01 | | | 0.84 | 0.89 | 0.90 | | | | 0.64 |
| Kinematic Viscosity | cSt | 195.72 | 1.10 | | 11.81 | 3.67 | 20.99 | 41.18 | 1.76 | | | 0.38 |
| Viscosity | cP | 179.62 | 1.12 | | 0.02 | 3.07 | 18.62 | 37.06 | 0.01 | | | 0.24 |

| | Unit | Diluent Product | Recovered Water 1 | Fuel Gas from V-101 | Fuel Gas | Recovered Hydrocarbon | Recovered Water 2 |
|---|---|---|---|---|---|---|---|
| Vapour Fraction | | 0.00 | 0.00 | 1.00 | 1.00 | 0.00 | 0.00 |
| Temperature | F | 100 | 133 | 133 | 150 | 150 | 150 |
| Pressure | psia | 105 | 65 | 20 | 43 | 43 | 68 |
| Molar Flow | lbmole/hr | 757 | 143 | 532 | 157 | 327 | 49 |
| Mass Flow | lb/hr | 64,606 | 2,577 | 35,740 | 10,267 | 24,596 | 878 |
| Liquid Volume Flow | barrel/day | 6,539 | 177 | 3,800 | 1,122 | 2,618 | 60 |
| Specific Gravity | | 0.66 | 0.98 | | 1.09 | 0.59 | 0.98 |
| Kinematic Viscosity | cSt | 0.44 | 0.50 | | | 0.29 | 0.44 |
| Viscosity | cP | 0.29 | 0.49 | | 0.01 | 0.17 | 0.43 |

FIG. 8A

Stream Compositions 235° F Flash Point

| | Unit | Cold Lake Sim | Heavy Product | Diluent Product | Recovered Hydrocarbon | Fuel Gas |
|---|---|---|---|---|---|---|
| Comp Mole Frac (Methane) | | 0 | 0 | 0 | 0 | 0 |
| Comp Mole Frac (Ethane) | | 0 | 0 | 0 | 0 | 0 |
| Comp Mole Frac (Propane) | | 0.001229 | 0 | 0.000438 | 0.002062 | 0.012996 |
| Comp Mole Frac (i-Butane) | | 0.006991 | 0.000012 | 0.00495 | 0.017125 | 0.050888 |
| Comp Mole Frac (n-Butane) | | 0.026566 | 0.000077 | 0.023541 | 0.070357 | 0.159461 |
| Comp Mole Frac (i-Pentane) | | 0.116767 | 0.001417 | 0.172504 | 0.318653 | 0.340903 |
| Comp Mole Frac (n-Pentane) | | 0.119771 | 0.001927 | 0.199399 | 0.311498 | 0.269644 |
| Comp Mole Frac (n-Hexane) | | 0.104362 | 0.006322 | 0.246232 | 0.17043 | 0.057948 |
| Comp Mole Frac (n-Heptane) | | 0.038118 | 0.005954 | 0.101582 | 0.029262 | 0.004075 |
| Comp Mole Frac (n-Octane) | | 0.021106 | 0.006734 | 0.055127 | 0.006354 | 0.000367 |
| Comp Mole Frac (n-Nonane) | | 0.013729 | 0.007893 | 0.031179 | 0.001457 | 0.000036 |
| Comp Mole Frac (n-Decane) | | 0.013137 | 0.021404 | 0.007225 | 0.00014 | 0.000002 |
| Comp Mole Frac (Mcyclopentan) | | 0.018669 | 0.001419 | 0.044401 | 0.029014 | 0.009394 |
| Comp Mole Frac (Benzene) | | 0.005896 | 0.000476 | 0.013961 | 0.009141 | 0.003078 |
| Comp Mole Frac (Cyclohexane) | | 0.011588 | 0.001172 | 0.028506 | 0.015492 | 0.00414 |
| Comp Mole Frac (Mcyclohexane) | | 0.014622 | 0.002811 | 0.038051 | 0.011277 | 0.00162 |
| Comp Mole Frac (Toluene) | | 0.006174 | 0.001307 | 0.01625 | 0.003969 | 0.000475 |
| Comp Mole Frac (E-Benzene) | | 0.000765 | 0.000313 | 0.001905 | 0.000186 | 0.000009 |
| Comp Mole Frac (p-Xylene) | | 0.001531 | 0.000663 | 0.003769 | 0.000322 | 0.000014 |
| Comp Mole Frac (m-Xylene) | | 0.001276 | 0.000552 | 0.003142 | 0.000266 | 0.000012 |
| Comp Mole Frac (o-Xylene) | | 0.001021 | 0.00048 | 0.002458 | 0.000194 | 0.000008 |
| Comp Mole Frac (124-MBenzene) | | 0.002254 | 0.002264 | 0.003561 | 0.000098 | 0.000002 |
| Comp Mole Frac (H2O) | | 0 | 0.006416 | 0.001816 | 0.002701 | 0.084931 |
| Comp Mole Frac (NBP[2]395*) | | 0.005426 | 0.01064 | 0.000002 | 0 | 0 |
| Comp Mole Frac (NBP[2]421*) | | 0.010049 | 0.019707 | 0 | 0 | 0 |
| Comp Mole Frac (NBP[2]446*) | | 0.013842 | 0.027144 | 0 | 0 | 0 |
| Comp Mole Frac (NBP[2]472*) | | 0.015771 | 0.030927 | 0 | 0 | 0 |
| Comp Mole Frac (NBP[2]498*) | | 0.016575 | 0.032504 | 0 | 0 | 0 |
| Comp Mole Frac (NBP[2]525*) | | 0.016836 | 0.033016 | 0 | 0 | 0 |
| Comp Mole Frac (NBP[2]551*) | | 0.017127 | 0.033587 | 0 | 0 | 0 |
| Comp Mole Frac (NBP[2]575*) | | 0.014987 | 0.02939 | 0 | 0 | 0 |
| Comp Mole Frac (NBP[2]605*) | | 0.012899 | 0.025295 | 0 | 0 | 0 |
| Comp Mole Frac (NBP[2]631*) | | 0.017502 | 0.034322 | 0 | 0 | 0 |
| Comp Mole Frac (NBP[2]656*) | | 0.016847 | 0.033039 | 0 | 0 | 0 |
| Comp Mole Frac (NBP[2]682*) | | 0.016305 | 0.031975 | 0 | 0 | 0 |
| Comp Mole Frac (NBP[2]708*) | | 0.015211 | 0.02983 | 0 | 0 | 0 |
| Comp Mole Frac (NBP[2]735*) | | 0.014395 | 0.02823 | 0 | 0 | 0 |
| Comp Mole Frac (NBP[2]762*) | | 0.015006 | 0.029428 | 0 | 0 | 0 |
| Comp Mole Frac (NBP[2]788*) | | 0.015548 | 0.030491 | 0 | 0 | 0 |
| Comp Mole Frac (NBP[2]824*) | | 0.025133 | 0.049287 | 0 | 0 | 0 |
| Comp Mole Frac (NBP[2]876*) | | 0.020632 | 0.04046 | 0 | 0 | 0 |
| Comp Mole Frac (NBP[2]925*) | | 0.019206 | 0.037664 | 0 | 0 | 0 |
| Comp Mole Frac (NBP[2]975*) | | 0.01694 | 0.03322 | 0 | 0 | 0 |
| Comp Mole Frac (NBP[2]1025*) | | 0.015074 | 0.029561 | 0 | 0 | 0 |
| Comp Mole Frac (NBP[2]1075*) | | 0.013981 | 0.027417 | 0 | 0 | 0 |
| Comp Mole Frac (NBP[2]1125*) | | 0.012584 | 0.024678 | 0 | 0 | 0 |
| Comp Mole Frac (NBP[2]1175*) | | 0.011573 | 0.022696 | 0 | 0 | 0 |
| Comp Mole Frac (NBP[2]1253*) | | 0.022882 | 0.044873 | 0 | 0 | 0 |
| Comp Mole Frac (NBP[2]1348*) | | 0.028385 | 0.055664 | 0 | 0 | 0 |
| Comp Mole Frac (NBP[2]1438*) | | 0.020641 | 0.040478 | 0 | 0 | 0 |
| Comp Mole Frac (NBP[2]1539*) | | 0.01454 | 0.028514 | 0 | 0 | 0 |
| Comp Mole Frac (NBP[2]1634*) | | 0.008455 | 0.016581 | 0 | 0 | 0 |
| Comp Mole Frac (NBP[2]1730*) | | 0.00518 | 0.010158 | 0 | 0 | 0 |

FIG. 8B1

Stream Compositions 235° F Flash Point

| | Unit | Cold Lake Sim | Heavy Product | Diluent Product | Recovered Hydrocarbon | Fuel Gas |
|---|---|---|---|---|---|---|
| Comp Mole Frac (NBP[2]1833*) | | 0.002654 | 0.005206 | 0 | 0 | 0 |
| Comp Mole Frac (NBP[2]1937*) | | 0.002243 | 0.004399 | 0 | 0 | 0 |
| Comp Mole Frac (NBP[3]423*) | | 0 | 0 | 0 | 0 | 0 |
| Comp Mole Frac (NBP[3]452*) | | 0 | 0 | 0 | 0 | 0 |
| Comp Mole Frac (NBP[3]473*) | | 0 | 0 | 0 | 0 | 0 |
| Comp Mole Frac (NBP[3]500*) | | 0 | 0 | 0 | 0 | 0 |
| Comp Mole Frac (NBP[3]526*) | | 0 | 0 | 0 | 0 | 0 |
| Comp Mole Frac (NBP[3]552*) | | 0 | 0 | 0 | 0 | 0 |
| Comp Mole Frac (NBP[3]579*) | | 0 | 0 | 0 | 0 | 0 |
| Comp Mole Frac (NBP[3]605*) | | 0 | 0 | 0 | 0 | 0 |
| Comp Mole Frac (NBP[3]630*) | | 0 | 0 | 0 | 0 | 0 |
| Comp Mole Frac (NBP[3]658*) | | 0 | 0 | 0 | 0 | 0 |
| Comp Mole Frac (NBP[3]683*) | | 0 | 0 | 0 | 0 | 0 |
| Comp Mole Frac (NBP[3]709*) | | 0 | 0 | 0 | 0 | 0 |
| Comp Mole Frac (NBP[3]735*) | | 0 | 0 | 0 | 0 | 0 |
| Comp Mole Frac (NBP[3]762*) | | 0 | 0 | 0 | 0 | 0 |
| Comp Mole Frac (NBP[3]788*) | | 0 | 0 | 0 | 0 | 0 |
| Comp Mole Frac (NBP[3]825*) | | 0 | 0 | 0 | 0 | 0 |
| Comp Mole Frac (NBP[3]875*) | | 0 | 0 | 0 | 0 | 0 |
| Comp Mole Frac (NBP[3]925*) | | 0 | 0 | 0 | 0 | 0 |
| Comp Mole Frac (NBP[3]975*) | | 0 | 0 | 0 | 0 | 0 |
| Comp Mole Frac (NBP[3]1025*) | | 0 | 0 | 0 | 0 | 0 |
| Comp Mole Frac (NBP[3]1075*) | | 0 | 0 | 0 | 0 | 0 |
| Comp Mole Frac (NBP[3]1125*) | | 0 | 0 | 0 | 0 | 0 |
| Comp Mole Frac (NBP[3]1175*) | | 0 | 0 | 0 | 0 | 0 |
| Comp Mole Frac (NBP[3]1251*) | | 0 | 0 | 0 | 0 | 0 |
| Comp Mole Frac (NBP[3]1338*) | | 0 | 0 | 0 | 0 | 0 |
| Comp Mole Frac (NBP[3]1436*) | | 0 | 0 | 0 | 0 | 0 |
| Comp Mole Frac (NBP[3]1530*) | | 0 | 0 | 0 | 0 | 0 |
| Comp Mole Frac (NBP[3]1626*) | | 0 | 0 | 0 | 0 | 0 |

FIG. 8B2

235° F Flash Point

| | | |
|---|---|---|
| Stream: Heavy Product | Boiling Point Curves: | Boiling Point Curves-Dru |

BOILING POINT CURVES

| Basis | Stream |
|---|---|
| Liquid Volume | Heavy Product |

RESULTS

BP Curves Results

| Cut Point (%) | TBP (F) | ASTM D86 (F) | D86 Crack Reduced (F) | ASTM D1160(Vac) (F) | ASTM D1160(Atm) (F) | ASTM D2887 (F) |
|---|---|---|---|---|---|---|
| 0.00 | 210.47 | 298.37 | 298.37 | 27.97 | 210.47 | 212.00 |
| 1.00 | 291.53 | 348.59 | 348.59 | 91.25 | 291.50 | 259.14 |
| 2.00 | 362.05 | 396.95 | 396.95 | 147.20 | 362.09 | 300.03 |
| 3.50 | 431.86 | 447.80 | 447.80 | 203.25 | 431.85 | 350.88 |
| 5.00 | 461.88 | 470.69 | 470.69 | 227.62 | 461.87 | 390.84 |
| 7.50 | 502.12 | 502.12 | 496.27 | 260.50 | 502.12 | 438.43 |
| 10.00 | 538.17 | 530.97 | 523.12 | 290.19 | 538.17 | 469.91 |
| 12.50 | 570.43 | 557.28 | 547.06 | 316.93 | 570.43 | 495.18 |
| 15.00 | 610.67 | 590.66 | 576.61 | 350.53 | 610.66 | 526.39 |
| 17.50 | 641.02 | 616.26 | 598.40 | 376.06 | 641.02 | 556.29 |
| 20.00 | 668.14 | 639.37 | 617.39 | 399.00 | 668.14 | 582.57 |
| 25.00 | 724.48 | 688.02 | 654.91 | 447.07 | 724.48 | 631.90 |
| 30.00 | 779.37 | 735.83 | 688.18 | 494.42 | 779.37 | 682.38 |
| 35.00 | 830.01 | 779.65 | 715.47 | 538.59 | 830.01 | 733.15 |
| 40.00 | 889.56 | 831.40 | 743.87 | 591.12 | 889.56 | 784.55 |
| 45.00 | 951.25 | 885.61 | 769.63 | 646.22 | 951.24 | 840.05 |
| 50.00 | 1017.86 | 944.94 | 793.83 | 706.34 | 1017.86 | 902.15 |
| 55.00 | 1087.92 | 1009.31 | 816.26 | 770.86 | 1087.92 | 969.41 |
| 60.00 | 1161.77 | 1077.99 | 836.72 | 839.72 | 1161.77 | 1041.52 |
| 65.00 | 1238.18 | 1149.45 | 855.23 | 912.12 | 1238.19 | 1116.11 |
| 70.00 | 1301.81 | 1210.27 | 869.25 | 973.05 | 1301.55 | 1190.87 |
| 75.00 | 1354.26 | 1262.39 | 879.69 | 1024.36 | 1354.23 | 1255.86 |
| 80.00 | 1405.06 | 1313.55 | 887.33 | 1074.33 | 1404.97 | 1311.88 |
| 85.00 | 1467.21 | 1375.40 | 893.55 | 1136.34 | 1467.16 | 1384.00 |
| 90.00 | 1548.85 | 1441.26 | 900.12 | 1219.04 | 1548.79 | 1472.26 |
| 92.50 | 1597.99 | 1466.81 | 903.18 | 1269.50 | 1597.88 | 1517.56 |
| 95.00 | 1681.69 | 1507.76 | 910.65 | 1345.00 | 1670.35 | 1550.06 |
| 96.50 | 1717.28 | 1543.45 | 923.90 | 1394.50 | 1717.22 | 1630.58 |
| 98.00 | 1808.36 | 1592.04 | 946.39 | 1492.39 | 1808.49 | 1721.50 |
| 99.00 | 1851.61 | 1606.85 | 951.14 | 1539.44 | 1851.68 | 1745.99 |
| 100.00 | 1884.31 | 1613.14 | 952.89 | 1575.30 | 1884.31 | 1761.86 |

COLD PROPERTIES

| True VP at 37.8 C | (psia) | --- | Cetane Index | | | --- |
|---|---|---|---|---|---|---|
| Reid VP at 37.8 C | (psia) | --- | Research Octane Number | | | --- |
| ASTM D93 Flash Point | (F) | 236.7295 | Viscosity at 37.8 C | | (cP) | 2217.65731 |
| ASTM D97 Pour Point | (F) | 75.3829 | Viscosity at 97.8 C | | (cP) | 38.63362 |
| Refractive Index | | 1.5283 | | | | |

P:N:A

| Paraffins [mol%] | 93.3260 | Naphthas [mol%] | 6.6740 | Aromatics [mol%] | 0.0000 |
|---|---|---|---|---|---|

FIG. 8C

235° F Flash Point

| | | | | | | |
|---|---|---|---|---|---|---|
| Case Name: | | | (4 overhead exchangers Tray 11, 235 FP).hsc | | | |
| | | | | | | |
| Stream: | Diluent Product | | Boiling Point Curves: | Boiling Point Curves-Dil | | |
| BOILING POINT CURVES | | | | | | |
| Basis | | | | Stream | | |
| Liquid Volume | | | | Diluent Product | | |
| RESULTS | | | | | | |
| BP Curves Results | | | | | | |
| Cut Point (%) | TBP (F) | ASTM D86 (F) | D86 Crack Reduced (F) | ASTM D1160(Vac) (F) | ASTM D1160(Atm) (F) | ASTM D2887 (F) |
| 0.00 | 20.63 | 86.05 | 86.05 | -84.30 | 63.51 | 27.36 |
| 1.00 | 28.36 | 91.86 | 91.86 | -81.07 | 67.80 | 35.18 |
| 2.00 | 34.76 | 95.75 | 95.75 | -78.05 | 71.80 | 42.72 |
| 3.50 | 43.42 | 100.31 | 100.31 | -73.90 | 77.30 | 53.40 |
| 5.00 | 55.80 | 104.87 | 104.87 | -70.19 | 82.20 | 63.17 |
| 7.50 | 69.62 | 116.07 | 116.07 | -64.93 | 89.18 | 76.73 |
| 10.00 | 81.30 | 120.44 | 120.44 | -60.71 | 94.73 | 86.73 |
| 12.50 | 84.17 | 121.60 | 121.60 | -59.18 | 96.75 | 92.41 |
| 15.00 | 86.34 | 122.57 | 122.57 | -57.84 | 98.51 | 96.23 |
| 17.50 | 88.51 | 123.53 | 123.53 | -56.51 | 100.27 | 98.26 |
| 20.00 | 90.67 | 124.50 | 124.50 | -53.24 | 104.59 | 100.79 |
| 25.00 | 95.01 | 126.43 | 126.43 | -51.94 | 106.29 | 106.59 |
| 30.00 | 104.20 | 131.77 | 131.77 | -46.78 | 113.08 | 114.59 |
| 35.00 | 116.51 | 140.77 | 140.77 | -37.80 | 124.88 | 126.51 |
| 40.00 | 133.24 | 150.18 | 150.18 | -28.51 | 137.05 | 142.66 |
| 45.00 | 146.64 | 158.94 | 158.94 | -19.89 | 148.32 | 157.60 |
| 50.00 | 156.12 | 164.94 | 164.94 | -13.91 | 156.14 | 167.91 |
| 55.00 | 158.01 | 166.12 | 166.12 | -12.46 | 158.02 | 174.09 |
| 60.00 | 159.90 | 167.31 | 167.31 | -11.02 | 159.90 | 175.74 |
| 65.00 | 171.67 | 174.76 | 174.76 | -1.97 | 171.67 | 179.39 |
| 70.00 | 187.36 | 185.91 | 185.91 | 7.87 | 184.46 | 191.40 |
| 75.00 | 209.26 | 202.36 | 202.36 | 27.03 | 209.26 | 203.86 |
| 80.00 | 212.14 | 204.80 | 204.80 | 29.27 | 212.14 | 215.70 |
| 85.00 | 229.53 | 219.95 | 219.95 | 42.77 | 229.53 | 233.70 |
| 90.00 | 260.98 | 249.00 | 249.00 | 67.30 | 260.98 | 261.03 |
| 92.50 | 270.36 | 257.85 | 257.85 | 77.52 | 274.03 | 279.38 |
| 95.00 | 297.02 | 282.69 | 282.69 | 95.80 | 297.02 | 300.32 |
| 96.50 | 305.08 | 289.99 | 289.99 | 101.96 | 305.08 | 312.69 |
| 98.00 | 317.16 | 300.39 | 300.39 | 111.52 | 317.12 | 325.44 |
| 99.00 | 325.22 | 307.33 | 307.33 | 117.89 | 325.24 | 335.13 |
| 100.00 | 333.28 | 314.26 | 314.26 | 124.27 | 333.28 | 346.17 |
| COLD PROPERTIES | | | | | | |
| True VP at 37.8 C | | (psia) | --- | Cetane Index | | --- |
| Reid VP at 37.8 C | | (psia) | --- | Research Octane Number | | 61.4790 |
| ASTM D93 Flash Point | | (F) | -52.0289 | Viscosity at 37.8 C | (cP) | 0.29122 |
| ASTM D97 Pour Point | | (F) | --- | Viscosity at 97.8 C | (cP) | 0.17010 |
| Refractive Index | | | 1.3806 | | | |
| P:N:A | | | | | | |
| Paraffins [mol%] | | 78.8671 | Naphthas [mol%] | 19.4986 | Aromatics [mol%] | 1.6343 |

FIG. 8D

235° F Flash Point

| | | |
|---|---|---|
| Case Name: | | (4 overhead exchangers Tray 11, 235 FP).hsc |
| Unit Set: | | Field2ev2 |
| Date/Time: | | Wed Mar 30 10:42:21 2016 |

| Stream: | Fuel Gas | Boiling Point Curves: Boiling Point Curves-Fue |
|---|---|---|

BOILING POINT CURVES

| Basis | Stream |
|---|---|
| Liquid Volume | Fuel Gas |

RESULTS

BP Curves Results

| Cut Point (%) | TBP (F) | ASTM D86 (F) | D86 Crack Reduced (F) | ASTM D1160(Vac) (F) | ASTM D1160(Atm) (F) | ASTM D2887 (F) |
|---|---|---|---|---|---|---|
| 0.00 | -43.76 | 23.84 | 23.84 | -131.98 | -0.18 | -33.30 |
| 1.00 | -34.47 | 29.44 | 29.44 | -128.72 | 4.21 | -21.80 |
| 2.00 | -15.47 | 40.83 | 40.83 | -122.02 | 13.20 | -10.53 |
| 3.50 | 8.65 | 55.26 | 55.26 | -113.41 | 24.72 | 5.38 |
| 5.00 | 13.54 | 57.99 | 57.99 | -111.15 | 27.74 | 19.30 |
| 7.50 | 18.48 | 60.58 | 60.58 | -108.44 | 31.37 | 28.96 |
| 10.00 | 23.39 | 63.15 | 63.15 | -105.73 | 34.99 | 33.97 |
| 12.50 | 28.29 | 65.71 | 65.71 | -103.02 | 38.60 | 39.00 |
| 15.00 | 33.25 | 68.31 | 68.31 | -100.20 | 42.36 | 44.10 |
| 17.50 | 38.36 | 70.97 | 70.97 | -97.19 | 46.36 | 49.33 |
| 20.00 | 43.47 | 73.62 | 73.62 | -94.14 | 50.43 | 54.70 |
| 25.00 | 53.57 | 78.87 | 78.87 | -87.96 | 58.64 | 65.52 |
| 30.00 | 63.33 | 83.94 | 83.94 | -81.85 | 66.78 | 76.15 |
| 35.00 | 72.51 | 88.71 | 88.71 | -75.99 | 74.54 | 86.53 |
| 40.00 | 80.87 | 93.09 | 93.09 | -70.54 | 81.75 | 95.75 |
| 45.00 | 83.97 | 94.92 | 94.92 | -68.38 | 84.60 | 100.75 |
| 50.00 | 86.12 | 96.29 | 96.29 | -66.83 | 86.65 | 104.25 |
| 55.00 | 88.28 | 97.66 | 97.66 | -85.28 | 88.70 | 106.66 |
| 60.00 | 90.43 | 99.03 | 99.03 | -63.73 | 90.75 | 109.31 |
| 65.00 | 92.58 | 100.40 | 100.40 | -62.18 | 92.80 | 111.99 |
| 70.00 | 94.74 | 101.77 | 101.77 | -60.63 | 94.84 | 114.16 |
| 75.00 | 96.84 | 103.14 | 103.14 | -59.11 | 96.84 | 120.89 |
| 80.00 | 115.15 | 120.01 | 120.01 | -45.18 | 115.19 | 128.34 |
| 85.00 | 132.61 | 134.02 | 134.02 | -31.87 | 132.65 | 143.06 |
| 90.00 | 147.43 | 145.03 | 145.03 | -20.58 | 147.45 | 158.97 |
| 92.50 | 153.31 | 149.40 | 149.40 | -16.07 | 153.31 | 164.33 |
| 95.00 | 157.71 | 153.03 | 153.03 | -12.70 | 157.71 | 167.97 |
| 96.50 | 159.71 | 154.85 | 154.85 | -11.16 | 159.71 | 170.10 |
| 98.00 | 162.76 | 157.66 | 157.66 | -8.82 | 162.76 | 172.29 |
| 99.00 | 176.93 | 170.59 | 170.59 | 2.09 | 176.95 | 183.62 |
| 100.00 | 191.11 | 183.51 | 183.51 | 13.00 | 191.11 | 199.99 |

COLD PROPERTIES

| True VP at 37.8 C | (psia) | --- | Cetane Index | | --- |
|---|---|---|---|---|---|
| Reid VP at 37.8 C | (psia) | --- | Research Octane Number | | --- |
| ASTM D93 Flash Point | (F) | --- | Viscosity at 37.8 C | (cP) | 0.20335 |
| ASTM D97 Pour Point | (F) | --- | Viscosity at 97.8 C | (cP) | 0.11947 |
| Refractive Index | | 1.3530 | | | |

P:N:A

| Paraffins [mol%] | --- | Naphthas [mol%] | --- | Aromatics [mol%] | --- |
|---|---|---|---|---|---|

FIG. 8E

235° F Flash Point

Case Name: (4 overhead exchangers Tray 11, 235 FP).hsc

Stream Recovered Hydrocarbon — Boiling Point Curves: Boiling Point Curves-Re

BOILING POINT CURVES

| Basis | Stream |
|---|---|
| Liquid Volume | Recovered Hydrocarbon |

RESULTS

BP Curves Results

| Cut Point (%) | TBP (F) | ASTM D86 (F) | D86 Crack Reduced (F) | ASTM D1160(Vac) (F) | ASTM D1160(Atm) (F) | ASTM D2887 (F) |
|---|---|---|---|---|---|---|
| 0.00 | 2.50 | 57.17 | 57.17 | -107.05 | 33.22 | 4.79 |
| 1.00 | 11.37 | 61.82 | 61.82 | -103.04 | 38.57 | 15.23 |
| 2.00 | 18.96 | 64.49 | 64.49 | -101.78 | 40.28 | 23.44 |
| 3.50 | 26.98 | 69.72 | 69.72 | -99.83 | 42.85 | 30.72 |
| 5.00 | 32.01 | 72.07 | 72.07 | -97.86 | 45.47 | 37.96 |
| 7.50 | 38.82 | 75.49 | 75.49 | -94.23 | 50.31 | 44.92 |
| 10.00 | 45.83 | 78.92 | 78.92 | -90.37 | 55.45 | 50.54 |
| 12.50 | 52.44 | 82.34 | 82.34 | -86.35 | 60.78 | 55.76 |
| 15.00 | 59.24 | 89.98 | 89.98 | -82.25 | 66.23 | 61.64 |
| 17.50 | 66.05 | 92.74 | 92.74 | -78.13 | 71.69 | 69.26 |
| 20.00 | 77.70 | 94.98 | 94.98 | -74.06 | 77.09 | 79.17 |
| 25.00 | 82.93 | 97.74 | 97.74 | -68.21 | 84.83 | 90.07 |
| 30.00 | 85.30 | 99.14 | 99.14 | -66.69 | 86.83 | 96.90 |
| 35.00 | 87.68 | 101.19 | 101.19 | -64.25 | 90.05 | 100.56 |
| 40.00 | 91.65 | 101.88 | 101.88 | -63.53 | 91.01 | 105.96 |
| 45.00 | 92.88 | 102.85 | 102.85 | -62.75 | 92.03 | 109.50 |
| 50.00 | 94.43 | 103.96 | 103.96 | -61.40 | 93.82 | 111.34 |
| 55.00 | 98.34 | 106.95 | 106.95 | -58.19 | 98.05 | 115.41 |
| 60.00 | 111.57 | 116.12 | 116.12 | -48.10 | 111.34 | 121.06 |
| 65.00 | 125.01 | 125.48 | 125.48 | -37.81 | 124.86 | 130.10 |
| 70.00 | 137.69 | 134.33 | 134.33 | -28.09 | 137.61 | 141.61 |
| 75.00 | 148.63 | 141.98 | 141.98 | -19.66 | 148.60 | 152.55 |
| 80.00 | 156.14 | 147.25 | 147.25 | -13.90 | 156.14 | 161.10 |
| 85.00 | 158.69 | 149.06 | 149.06 | -11.94 | 158.69 | 166.17 |
| 90.00 | 161.24 | 150.87 | 150.87 | -9.99 | 161.24 | 169.44 |
| 92.50 | 176.97 | 162.37 | 162.37 | 2.10 | 176.97 | 180.10 |
| 95.00 | 206.40 | 185.96 | 185.96 | 24.82 | 206.40 | 204.29 |
| 96.50 | 211.29 | 190.06 | 190.06 | 28.61 | 211.29 | 212.80 |
| 98.00 | 217.31 | 195.74 | 195.74 | 33.29 | 217.32 | 218.82 |
| 99.00 | 234.70 | 212.92 | 212.92 | 46.82 | 234.74 | 232.25 |
| 100.00 | 252.10 | 230.10 | 230.10 | 60.36 | 252.10 | 252.74 |

COLD PROPERTIES

| | | | | | |
|---|---|---|---|---|---|
| True VP at 37.8 C | (psia) | --- | Cetane Index | | --- |
| Reid VP at 37.8 C | (psia) | --- | Research Octane Number | | 75.3214 |
| ASTM D93 Flash Point | (F) | --- | Viscosity at 37.8 C | (cP) | 0.22234 |
| ASTM D97 Pour Point | (F) | --- | Viscosity at 97.8 C | (cP) | 0.13267 |
| Refractive Index | | 1.3636 | | | |

P:N:A

| | | | | | |
|---|---|---|---|---|---|
| Paraffins [mol%] | 89.2736 | Naphthas [mol%] | 10.7264 | Aromatics [mol%] | 0.0000 |

FIG. 8F

Heat and Material Balance
210° F Flash Point

| | Unit | Cold Lake Sim | Water in Dilbit | Column Feed | Stripping Steam | Heavy | Heavy to Storage | Heavy Product | ToCondenser | To AE-101 | To V-101 | Reflux |
|---|---|---|---|---|---|---|---|---|---|---|---|---|
| Vapour Fraction | | 0.00 | 0.00 | 0.38 | 1.00 | 0.00 | 0.00 | 0.00 | 1.00 | 0.62 | 0.37 | 0.00 |
| Temperature | F | 60 | 60 | 335 | 550 | 311 | 250 | 212 | 175 | 145 | 132 | 133 |
| Pressure | psia | 15 | 265 | 65 | 62 | 29 | 115 | 65 | 26 | 22 | 20 | 115 |
| Molar Flow | lbmole/hr | 2,475 | 159 | 2,634 | 56 | 1,435 | 1,435 | 1,435 | 2,282 | 2,282 | 2,282 | 1,027 |
| Mass Flow | lb/hr | 670,467 | 2,856 | 673,323 | 1,000 | 589,828 | 589,828 | 589,828 | 169,072 | 169,072 | 169,072 | 84,583 |
| Liquid Volume Flow | barrel/day | 50,000 | 196 | 50,196 | 69 | 41,502 | 41,502 | 41,502 | 17,390 | 17,390 | 17,390 | 8,628 |
| Specific Gravity | | 0.92 | 1.01 | | | 0.86 | 0.88 | 0.89 | | | | 0.64 |
| Kinematic Viscosity | cSt | 195.72 | 1.10 | | 11.81 | 8.12 | 16.32 | 29.53 | 1.64 | | | 0.36 |
| Viscosity | cP | 179.62 | 1.12 | | 0.02 | 6.96 | 14.38 | 26.40 | 0.01 | | | 0.23 |

| | Unit | Diluent Product | Recovered Water 1 | Fuel Gas from V-101 | Fuel Gas | Recovered Hydrocarbon | Recovered Water 2 |
|---|---|---|---|---|---|---|---|
| Vapour Fraction | | 0.00 | 0.00 | 1.00 | 1.00 | 0.00 | 0.00 |
| Temperature | F | 100 | 133 | 132 | 150 | 150 | 150 |
| Pressure | psia | 105 | 65 | 20 | 43 | 43 | 68 |
| Molar Flow | lbmole/hr | 310 | 107 | 833 | 77 | 668 | 88 |
| Mass Flow | lb/hr | 25,537 | 1,936 | 56,779 | 5,007 | 50,190 | 1,583 |
| Liquid Volume Flow | barrel/day | 2,605 | 133 | 6,000 | 547 | 5,345 | 109 |
| Specific Gravity | | 0.65 | 0.98 | | | 0.59 | 0.98 |
| Kinematic Viscosity | cSt | 0.42 | 0.50 | 2.09 | 1.09 | 0.29 | 0.44 |
| Viscosity | cP | 0.28 | 0.49 | 0.01 | 0.01 | 0.17 | 0.43 |

FIG. 10A

Stream Compositions 210° F Flash Point

| | Unit | Cold Lake Sim | Heavy Product | Diluent Product | Recovered Hydrocarbon | Fuel Gas |
|---|---|---|---|---|---|---|
| Comp Mole Frac (Methane) | | 0 | 0 | 0 | 0 | 0 |
| Comp Mole Frac (Ethane) | | 0 | 0 | 0 | 0 | 0 |
| Comp Mole Frac (Propane) | | 0.001229 | 0.000001 | 0.000303 | 0.002558 | 0.01612 |
| Comp Mole Frac (i-Butane) | | 0.006991 | 0.000032 | 0.003734 | 0.017954 | 0.053348 |
| Comp Mole Frac (n-Butane) | | 0.026566 | 0.000215 | 0.018647 | 0.070784 | 0.160406 |
| Comp Mole Frac (i-Pentane) | | 0.116767 | 0.004179 | 0.162401 | 0.309395 | 0.330997 |
| Comp Mole Frac (n-Pentane) | | 0.119771 | 0.005849 | 0.199546 | 0.307024 | 0.265814 |
| Comp Mole Frac (n-Hexane) | | 0.104362 | 0.018891 | 0.319752 | 0.18894 | 0.064241 |
| Comp Mole Frac (n-Heptane) | | 0.038118 | 0.025096 | 0.124297 | 0.028709 | 0.003998 |
| Comp Mole Frac (n-Octane) | | 0.021106 | 0.036349 | 0.000221 | 0.00002 | 0.000001 |
| Comp Mole Frac (n-Nonane) | | 0.013729 | 0.023681 | 0 | 0 | 0 |
| Comp Mole Frac (n-Decane) | | 0.013137 | 0.02266 | 0 | 0 | 0 |
| Comp Mole Frac (Mcyclopentan) | | 0.018669 | 0.004003 | 0.058189 | 0.032125 | 0.010391 |
| Comp Mole Frac (Benzene) | | 0.005896 | 0.001326 | 0.018125 | 0.010115 | 0.003407 |
| Comp Mole Frac (Cyclohexane) | | 0.011588 | 0.003274 | 0.038526 | 0.017332 | 0.004626 |
| Comp Mole Frac (Mcyclohexane) | | 0.014622 | 0.011339 | 0.042075 | 0.00997 | 0.001432 |
| Comp Mole Frac (Toluene) | | 0.006174 | 0.006835 | 0.01237 | 0.002374 | 0.000284 |
| Comp Mole Frac (E-Benzene) | | 0.000765 | 0.00132 | 0.000001 | 0 | 0 |
| Comp Mole Frac (p-Xylene) | | 0.001531 | 0.002641 | 0.000001 | 0 | 0 |
| Comp Mole Frac (m-Xylene) | | 0.001276 | 0.002201 | 0 | 0 | 0 |
| Comp Mole Frac (o-Xylene) | | 0.001021 | 0.001761 | 0 | 0 | 0 |
| Comp Mole Frac (124-MBenzene) | | 0.002254 | 0.003888 | 0 | 0 | 0 |
| Comp Mole Frac (H2O) | | 0 | 0.006095 | 0.001812 | 0.002701 | 0.084938 |
| Comp Mole Frac (NBP[2]395*) | | 0.005426 | 0.009359 | 0 | 0 | 0 |
| Comp Mole Frac (NBP[2]421*) | | 0.010049 | 0.017334 | 0 | 0 | 0 |
| Comp Mole Frac (NBP[2]446*) | | 0.013842 | 0.023876 | 0 | 0 | 0 |
| Comp Mole Frac (NBP[2]472*) | | 0.015771 | 0.027203 | 0 | 0 | 0 |
| Comp Mole Frac (NBP[2]498*) | | 0.016575 | 0.028591 | 0 | 0 | 0 |
| Comp Mole Frac (NBP[2]525*) | | 0.016836 | 0.029041 | 0 | 0 | 0 |
| Comp Mole Frac (NBP[2]551*) | | 0.017127 | 0.029543 | 0 | 0 | 0 |
| Comp Mole Frac (NBP[2]575*) | | 0.014987 | 0.025851 | 0 | 0 | 0 |
| Comp Mole Frac (NBP[2]605*) | | 0.012899 | 0.02225 | 0 | 0 | 0 |
| Comp Mole Frac (NBP[2]631*) | | 0.017502 | 0.03019 | 0 | 0 | 0 |
| Comp Mole Frac (NBP[2]656*) | | 0.016847 | 0.029061 | 0 | 0 | 0 |
| Comp Mole Frac (NBP[2]682*) | | 0.016305 | 0.028125 | 0 | 0 | 0 |
| Comp Mole Frac (NBP[2]708*) | | 0.015211 | 0.026239 | 0 | 0 | 0 |
| Comp Mole Frac (NBP[2]735*) | | 0.014395 | 0.024831 | 0 | 0 | 0 |
| Comp Mole Frac (NBP[2]762*) | | 0.015006 | 0.025885 | 0 | 0 | 0 |
| Comp Mole Frac (NBP[2]788*) | | 0.015548 | 0.02682 | 0 | 0 | 0 |
| Comp Mole Frac (NBP[2]824*) | | 0.025133 | 0.043353 | 0 | 0 | 0 |
| Comp Mole Frac (NBP[2]876*) | | 0.020632 | 0.035589 | 0 | 0 | 0 |
| Comp Mole Frac (NBP[2]925*) | | 0.019206 | 0.033129 | 0 | 0 | 0 |
| Comp Mole Frac (NBP[2]975*) | | 0.01694 | 0.029221 | 0 | 0 | 0 |
| Comp Mole Frac (NBP[2]1025*) | | 0.015074 | 0.026002 | 0 | 0 | 0 |
| Comp Mole Frac (NBP[2]1075*) | | 0.013981 | 0.024116 | 0 | 0 | 0 |
| Comp Mole Frac (NBP[2]1125*) | | 0.012584 | 0.021706 | 0 | 0 | 0 |
| Comp Mole Frac (NBP[2]1175*) | | 0.011573 | 0.019963 | 0 | 0 | 0 |
| Comp Mole Frac (NBP[2]1253*) | | 0.022882 | 0.03947 | 0 | 0 | 0 |
| Comp Mole Frac (NBP[2]1348*) | | 0.028385 | 0.048962 | 0 | 0 | 0 |
| Comp Mole Frac (NBP[2]1438*) | | 0.020641 | 0.035605 | 0 | 0 | 0 |
| Comp Mole Frac (NBP[2]1539*) | | 0.01454 | 0.025081 | 0 | 0 | 0 |
| Comp Mole Frac (NBP[2]1634*) | | 0.008455 | 0.014585 | 0 | 0 | 0 |
| Comp Mole Frac (NBP[2]1730*) | | 0.00518 | 0.008935 | 0 | 0 | 0 |

FIG. 10B1

Stream Compositions 210° F Flash Point

| | Unit | Cold Lake Sim | Heavy Product | Diluent Product | Recovered Hydrocarbon | Fuel Gas |
|---|---|---|---|---|---|---|
| Comp Mole Frac (NBP[2]1833*) | | 0.002654 | 0.004579 | 0 | 0 | 0 |
| Comp Mole Frac (NBP[2]1937*) | | 0.002243 | 0.00387 | 0 | 0 | 0 |
| Comp Mole Frac (NBP[3]423*) | | 0 | 0 | 0 | 0 | 0 |
| Comp Mole Frac (NBP[3]452*) | | 0 | 0 | 0 | 0 | 0 |
| Comp Mole Frac (NBP[3]473*) | | 0 | 0 | 0 | 0 | 0 |
| Comp Mole Frac (NBP[3]500*) | | 0 | 0 | 0 | 0 | 0 |
| Comp Mole Frac (NBP[3]526*) | | 0 | 0 | 0 | 0 | 0 |
| Comp Mole Frac (NBP[3]552*) | | 0 | 0 | 0 | 0 | 0 |
| Comp Mole Frac (NBP[3]579*) | | 0 | 0 | 0 | 0 | 0 |
| Comp Mole Frac (NBP[3]605*) | | 0 | 0 | 0 | 0 | 0 |
| Comp Mole Frac (NBP[3]630*) | | 0 | 0 | 0 | 0 | 0 |
| Comp Mole Frac (NBP[3]658*) | | 0 | 0 | 0 | 0 | 0 |
| Comp Mole Frac (NBP[3]683*) | | 0 | 0 | 0 | 0 | 0 |
| Comp Mole Frac (NBP[3]709*) | | 0 | 0 | 0 | 0 | 0 |
| Comp Mole Frac (NBP[3]735*) | | 0 | 0 | 0 | 0 | 0 |
| Comp Mole Frac (NBP[3]762*) | | 0 | 0 | 0 | 0 | 0 |
| Comp Mole Frac (NBP[3]788*) | | 0 | 0 | 0 | 0 | 0 |
| Comp Mole Frac (NBP[3]825*) | | 0 | 0 | 0 | 0 | 0 |
| Comp Mole Frac (NBP[3]875*) | | 0 | 0 | 0 | 0 | 0 |
| Comp Mole Frac (NBP[3]925*) | | 0 | 0 | 0 | 0 | 0 |
| Comp Mole Frac (NBP[3]975*) | | 0 | 0 | 0 | 0 | 0 |
| Comp Mole Frac (NBP[3]1025*) | | 0 | 0 | 0 | 0 | 0 |
| Comp Mole Frac (NBP[3]1075*) | | 0 | 0 | 0 | 0 | 0 |
| Comp Mole Frac (NBP[3]1125*) | | 0 | 0 | 0 | 0 | 0 |
| Comp Mole Frac (NBP[3]1175*) | | 0 | 0 | 0 | 0 | 0 |
| Comp Mole Frac (NBP[3]1251*) | | 0 | 0 | 0 | 0 | 0 |
| Comp Mole Frac (NBP[3]1338*) | | 0 | 0 | 0 | 0 | 0 |
| Comp Mole Frac (NBP[3]1436*) | | 0 | 0 | 0 | 0 | 0 |
| Comp Mole Frac (NBP[3]1530*) | | 0 | 0 | 0 | 0 | 0 |
| Comp Mole Frac (NBP[3]1626*) | | 0 | 0 | 0 | 0 | 0 |

FIG. 10B2

210° F Flash Point

| | | |
|---|---|---|
| | Case Name | (4 overhead exchangers Tray 11, 210 FP).hsc |
| Stream: Heavy Product | Boiling Point Curves: | Boiling Point Curves-Dru |

BOILING POINT CURVES

| Basis | Stream |
|---|---|
| Liquid Volume | Heavy Product |

RESULTS

BP Curves Results

| Cut Point (%) | TBP (F) | ASTM D86 (F) | D86 Crack Reduced (F) | ASTM D1160(Vac) (F) | ASTM D1160(Atm) (F) | ASTM D2887 (F) |
|---|---|---|---|---|---|---|
| 0.00 | 138.48 | 231.74 | 231.74 | -27.42 | 138.48 | 133.95 |
| 1.00 | 175.24 | 253.77 | 253.77 | 0.76 | 175.23 | 150.54 |
| 2.00 | 212.81 | 277.63 | 277.63 | 29.79 | 212.81 | 171.29 |
| 3.50 | 267.35 | 314.44 | 314.44 | 72.29 | 267.35 | 208.45 |
| 5.00 | 328.82 | 358.71 | 358.71 | 120.75 | 328.84 | 250.53 |
| 7.50 | 431.98 | 438.55 | 438.55 | 203.35 | 431.97 | 322.68 |
| 10.00 | 480.81 | 478.46 | 478.46 | 243.06 | 480.81 | 387.22 |
| 12.50 | 520.24 | 511.47 | 505.03 | 275.40 | 520.24 | 442.02 |
| 15.00 | 555.54 | 541.52 | 532.79 | 304.57 | 555.54 | 477.34 |
| 17.50 | 593.72 | 574.50 | 562.44 | 336.36 | 593.73 | 506.03 |
| 20.00 | 630.25 | 606.40 | 590.09 | 366.98 | 630.25 | 537.95 |
| 25.00 | 687.74 | 657.29 | 631.81 | 415.68 | 687.74 | 600.86 |
| 30.00 | 747.34 | 710.16 | 670.77 | 466.73 | 747.34 | 654.61 |
| 35.00 | 800.93 | 758.96 | 701.73 | 513.16 | 800.92 | 705.10 |
| 40.00 | 858.14 | 806.85 | 730.89 | 563.33 | 858.14 | 756.82 |
| 45.00 | 921.80 | 862.84 | 759.26 | 619.83 | 921.80 | 812.24 |
| 50.00 | 988.09 | 922.06 | 784.95 | 679.46 | 988.09 | 874.92 |
| 55.00 | 1060.26 | 988.28 | 809.32 | 745.34 | 1060.26 | 943.10 |
| 60.00 | 1135.80 | 1058.78 | 831.30 | 815.37 | 1135.80 | 1016.64 |
| 65.00 | 1215.31 | 1133.31 | 851.25 | 890.34 | 1215.34 | 1094.62 |
| 70.00 | 1286.70 | 1201.86 | 867.41 | 958.65 | 1286.65 | 1175.80 |
| 75.00 | 1343.45 | 1256.25 | 878.94 | 1013.80 | 1343.43 | 1247.07 |
| 80.00 | 1395.84 | 1311.45 | 887.08 | 1065.20 | 1395.74 | 1306.60 |
| 85.00 | 1458.07 | 1372.87 | 893.32 | 1127.18 | 1458.03 | 1379.87 |
| 90.00 | 1541.66 | 1442.99 | 900.31 | 1211.74 | 1541.64 | 1469.82 |
| 92.50 | 1590.74 | 1486.50 | 903.14 | 1261.99 | 1590.62 | 1517.80 |
| 95.00 | 1662.81 | 1506.64 | 910.36 | 1337.31 | 1663.03 | 1554.18 |
| 96.50 | 1710.54 | 1543.04 | 923.70 | 1387.31 | 1710.45 | 1632.60 |
| 98.00 | 1803.30 | 1591.87 | 946.33 | 1486.93 | 1803.45 | 1721.86 |
| 99.00 | 1849.50 | 1608.33 | 951.57 | 1537.11 | 1849.56 | 1746.97 |
| 100.00 | 1882.20 | 1614.61 | 953.28 | 1572.96 | 1882.20 | 1763.25 |

COLD PROPERTIES

| True VP at 37.8 C | (psia) | --- | Cetane Index | | | --- |
|---|---|---|---|---|---|---|
| Reid VP at 37.8 C | (psia) | --- | Research Octane Number | | | --- |
| ASTM D93 Flash Point | (F) | 209.9844 | Viscosity at 37.8 C | | (cP) | 842.85356 |
| ASTM D97 Pour Point | (F) | 72.8208 | Viscosity at 97.8 C | | (cP) | 27.37609 |
| Refractive Index | | 1.5243 | | | | |

P:N:A

| Paraffins [mol%] | 92.7225 | Naphthas [mol%] | 7.2775 | Aromatics [mol%] | 0.0000 |
|---|---|---|---|---|---|

FIG. 10C

210° F Flash Point

| | | | | | | | |
|---|---|---|---|---|---|---|---|
| | Case Name | | (4 overhead exchangers Tray 11, 210 FP).hsc | | | | |
| Stream: | Diluent Product | | Boiling Point Curves: Boiling Point Curves-Dil | | | | |
| | BOILING POINT CURVES | | | | | | |
| | Basis | | | | Stream | | |
| | Liquid Volume | | | | Diluent Product | | |
| | RESULTS | | | | | | |
| | BP Curves Results | | | | | | |
| Cut Point (%) | TBP (F) | ASTM D86 (F) | D86 Crack Reduced (F) | ASTM D1160(Vac) (F) | ASTM D1160(Atm) (F) | ASTM D2887 (F) | |
| 0.00 | 23.12 | 86.86 | 86.86 | -83.59 | 64.45 | 29.36 | |
| 1.00 | 30.42 | 92.40 | 92.40 | -80.32 | 68.79 | 37.66 | |
| 2.00 | 37.50 | 95.81 | 95.81 | -77.27 | 72.83 | 45.42 | |
| 3.50 | 47.69 | 100.65 | 100.65 | -73.12 | 78.32 | 55.97 | |
| 5.00 | 57.30 | 105.48 | 105.48 | -69.45 | 83.18 | 65.30 | |
| 7.50 | 71.89 | 116.64 | 116.64 | -64.32 | 89.97 | 76.31 | |
| 10.00 | 82.60 | 120.23 | 120.23 | -60.73 | 94.71 | 88.13 | |
| 12.50 | 84.77 | 121.18 | 121.18 | -59.40 | 96.46 | 93.37 | |
| 15.00 | 86.93 | 122.13 | 122.13 | -58.07 | 98.21 | 96.83 | |
| 17.50 | 89.10 | 123.08 | 123.08 | -56.74 | 99.97 | 98.76 | |
| 20.00 | 91.27 | 124.03 | 124.03 | -52.99 | 104.91 | 101.43 | |
| 25.00 | 95.60 | 125.40 | 125.40 | -52.13 | 106.05 | 107.83 | |
| 30.00 | 104.13 | 130.77 | 130.77 | -47.37 | 112.30 | 116.15 | |
| 35.00 | 115.67 | 137.76 | 137.76 | -40.02 | 121.97 | 126.67 | |
| 40.00 | 127.85 | 145.27 | 145.27 | -32.23 | 132.19 | 138.93 | |
| 45.00 | 139.78 | 152.72 | 152.72 | -24.57 | 142.21 | 150.98 | |
| 50.00 | 150.53 | 159.52 | 159.52 | -17.61 | 151.31 | 161.57 | |
| 55.00 | 156.34 | 163.22 | 163.22 | -13.76 | 156.33 | 169.24 | |
| 60.00 | 157.75 | 164.14 | 164.14 | -12.67 | 157.75 | 174.59 | |
| 65.00 | 159.16 | 165.07 | 165.07 | -11.59 | 159.16 | 177.44 | |
| 70.00 | 160.58 | 165.99 | 165.99 | -10.50 | 160.58 | 179.33 | |
| 75.00 | 174.27 | 176.05 | 176.05 | 0.02 | 174.27 | 185.61 | |
| 80.00 | 184.13 | 183.93 | 183.93 | 7.63 | 184.14 | 200.19 | |
| 85.00 | 200.54 | 197.32 | 197.32 | 20.30 | 200.55 | 214.18 | |
| 90.00 | 210.51 | 205.43 | 205.43 | 28.01 | 210.51 | 224.07 | |
| 92.50 | 211.69 | 206.35 | 206.35 | 28.92 | 211.69 | 225.70 | |
| 95.00 | 212.86 | 207.28 | 207.28 | 29.83 | 212.86 | 226.44 | |
| 96.50 | 213.27 | 207.62 | 207.62 | 30.15 | 213.27 | 227.73 | |
| 98.00 | 217.58 | 210.86 | 210.86 | 33.48 | 217.58 | 229.26 | |
| 99.00 | 219.72 | 212.47 | 212.47 | 35.85 | 220.63 | 230.93 | |
| 100.00 | 223.68 | 215.47 | 215.47 | 38.22 | 223.68 | 233.06 | |
| | COLDPROPERTIES | | | | | | |
| True VP at 37.8 C | (psia) | | --- | Cetane Index | | --- | |
| Reid VP at 37.8 C | (psia) | | --- | Research Octane Number | | 61.7924 | |
| ASTM D93 Flash Point | (F) | | -52.2159 | Viscosity at 37.8 C | (cP) | 0.27513 | |
| ASTM D97 Pour Point | (F) | | --- | Viscosity at 97.8 C | (cP) | 0.16176 | |
| Refractive Index | | | 1.3775 | | | | |
| | P:N:A | | | | | | |
| Paraffins [mol%] | 80.8691 | Naphthas [mol%] | | 18.5338 | Aromatics [mol%] | 0.5971 | |

FIG. 10D

210° F Flash Point

| | | | | | | |
|---|---|---|---|---|---|---|
| Case Name: | | | (4 overhead exchangers Tray 11, 210 FP).hsc | | | |
| Stream: | Fuel Gas | | Boiling Point Curves: Boiling Point Curves-Fue | | | |
| BOILING POINT CURVES | | | | | | |
| Basis | | | | Stream | | |
| Liquid Volume | | | | Fuel Gas | | |
| RESULTS | | | | | | |
| BP Curves Results | | | | | | |
| Cut Point (%) | TBP (F) | ASTM D86 (F) | D86 Crack Reduced (F) | ASTM D1160(Vac) (F) | ASTM D1160(Atm) (F) | ASTM D2887 (F) |
| 0.00 | -43.78 | 24.00 | 24.00 | -132.12 | -0.36 | -33.12 |
| 1.00 | -37.63 | 27.67 | 27.67 | -129.97 | 2.53 | -24.40 |
| 2.00 | -19.60 | 36.72 | 36.72 | -123.83 | 11.04 | -14.43 |
| 3.50 | 3.57 | 52.16 | 52.16 | -115.38 | 22.08 | 1.62 |
| 5.00 | 12.72 | 57.46 | 57.46 | -111.72 | 26.98 | 17.28 |
| 7.50 | 17.55 | 59.98 | 59.98 | -109.03 | 30.58 | 28.29 |
| 10.00 | 22.38 | 62.51 | 62.51 | -106.33 | 34.18 | 33.18 |
| 12.50 | 27.21 | 65.04 | 65.04 | -103.64 | 37.77 | 38.07 |
| 15.00 | 32.04 | 67.59 | 67.59 | -100.89 | 41.44 | 43.04 |
| 17.50 | 37.21 | 70.26 | 70.26 | -97.86 | 45.47 | 48.20 |
| 20.00 | 42.36 | 72.94 | 72.94 | -94.78 | 49.58 | 53.59 |
| 25.00 | 52.62 | 78.29 | 78.29 | -88.50 | 57.93 | 64.53 |
| 30.00 | 62.81 | 83.50 | 83.50 | -82.26 | 66.22 | 75.32 |
| 35.00 | 72.06 | 88.45 | 88.45 | -76.24 | 74.20 | 85.93 |
| 40.00 | 80.70 | 93.01 | 93.01 | -70.64 | 81.62 | 95.42 |
| 45.00 | 83.98 | 94.94 | 94.94 | -68.37 | 84.61 | 100.65 |
| 50.00 | 86.18 | 96.34 | 96.34 | -66.79 | 86.71 | 104.27 |
| 55.00 | 88.38 | 97.74 | 97.74 | -65.20 | 88.80 | 106.73 |
| 60.00 | 90.58 | 99.14 | 99.14 | -63.62 | 90.89 | 109.39 |
| 65.00 | 92.78 | 100.54 | 100.54 | -62.03 | 92.99 | 112.09 |
| 70.00 | 94.98 | 101.94 | 101.94 | -60.45 | 95.08 | 113.90 |
| 75.00 | 99.18 | 104.76 | 104.76 | -57.33 | 99.18 | 122.02 |
| 80.00 | 117.41 | 122.19 | 122.19 | -43.45 | 117.46 | 134.74 |
| 85.00 | 134.53 | 135.76 | 135.76 | -30.40 | 134.58 | 148.54 |
| 90.00 | 148.80 | 146.19 | 146.19 | -19.52 | 148.81 | 160.91 |
| 92.50 | 154.31 | 150.23 | 150.23 | -15.30 | 154.32 | 165.47 |
| 95.00 | 158.22 | 153.49 | 153.49 | -12.31 | 158.21 | 168.94 |
| 96.50 | 159.97 | 155.07 | 155.07 | -10.97 | 159.96 | 170.93 |
| 98.00 | 162.66 | 157.53 | 157.53 | -8.89 | 162.67 | 172.90 |
| 99.00 | 174.83 | 168.21 | 168.21 | 0.31 | 174.85 | 181.50 |
| 100.00 | 186.60 | 178.90 | 178.90 | 9.52 | 186.60 | 194.74 |
| COLD PROPERTIES | | | | | | |
| True VP at 37.8 C | (psia) | | --- | Cetane Index | | --- |
| Reid VP at 37.8 C | (psia) | | --- | Research Octane Number | | --- |
| ASTM D93 Flash Point | (F) | | --- | Viscosity at 37.8 C | (cP) | 0.20349 |
| ASTM D97 Pour Point | (F) | | --- | Viscosity at 97.8 C | (cP) | 0.11948 |
| Refractive Index | | | 1.3530 | | | |
| P:N:A | | | | | | |
| Paraffins [mol%] | | --- | Naphthas [mol%] | --- | Aromatics [mol%] | --- |

FIG. 10E

210° F Flash Point

| | | |
|---|---|---|
| | Case Name: | (4 overhead exchangers Tray 11_210 FP).hsc |

Stream Recovered Hydrocarbon | Boiling Point Curves: Boiling Point Curves-Re

BOILING POINT CURVES

| Basis | Stream |
|---|---|
| Liquid Volume | Recovered Hydrocarbon |

RESULTS

BP Curves Results

| Cut Point (%) | TBP (F) | ASTM D86 (F) | D86 Crack Reduced (F) | ASTM D1160(Vac) (F) | ASTM D1160(Atm) (F) | ASTM D2887 (F) |
|---|---|---|---|---|---|---|
| 0.00 | 0.46 | 56.01 | 56.01 | -107.80 | 32.22 | 3.28 |
| 1.00 | 10.96 | 61.65 | 61.65 | -102.90 | 38.76 | 15.11 |
| 2.00 | 19.14 | 64.32 | 64.32 | -101.71 | 40.34 | 24.08 |
| 3.50 | 24.20 | 70.09 | 70.09 | -99.93 | 42.72 | 31.23 |
| 5.00 | 31.65 | 72.06 | 72.06 | -98.12 | 45.13 | 37.03 |
| 7.50 | 38.60 | 75.57 | 75.57 | -94.59 | 49.83 | 44.86 |
| 10.00 | 45.56 | 79.09 | 79.09 | -90.75 | 54.94 | 50.67 |
| 12.50 | 52.52 | 82.60 | 82.60 | -86.87 | 60.36 | 56.20 |
| 15.00 | 59.48 | 90.09 | 90.09 | -82.44 | 65.98 | 62.36 |
| 17.50 | 66.44 | 92.94 | 92.94 | -78.14 | 71.68 | 70.26 |
| 20.00 | 77.88 | 95.27 | 95.27 | -73.86 | 77.35 | 80.16 |
| 25.00 | 83.07 | 98.09 | 98.09 | -68.04 | 85.06 | 90.52 |
| 30.00 | 85.50 | 99.51 | 99.51 | -66.50 | 87.09 | 97.22 |
| 35.00 | 87.92 | 101.84 | 101.84 | -63.75 | 90.72 | 101.33 |
| 40.00 | 92.51 | 102.59 | 102.59 | -62.98 | 91.74 | 106.98 |
| 45.00 | 93.53 | 103.38 | 103.38 | -62.18 | 92.79 | 110.39 |
| 50.00 | 95.07 | 104.69 | 104.69 | -60.83 | 94.57 | 112.17 |
| 55.00 | 100.42 | 108.62 | 108.62 | -56.57 | 100.19 | 116.87 |
| 60.00 | 113.15 | 117.39 | 117.39 | -46.87 | 112.96 | 123.14 |
| 65.00 | 126.05 | 126.32 | 126.32 | -37.00 | 125.92 | 132.69 |
| 70.00 | 138.24 | 134.79 | 134.79 | -27.66 | 138.17 | 143.86 |
| 75.00 | 148.81 | 142.16 | 142.16 | -19.54 | 148.79 | 154.19 |
| 80.00 | 156.11 | 147.28 | 147.28 | -13.93 | 156.11 | 162.24 |
| 85.00 | 158.41 | 148.93 | 148.93 | -12.16 | 158.41 | 166.42 |
| 90.00 | 160.70 | 150.59 | 150.59 | -10.40 | 160.70 | 168.68 |
| 92.50 | 173.07 | 160.09 | 160.09 | -0.90 | 173.07 | 174.77 |
| 95.00 | 188.28 | 173.81 | 173.81 | 10.62 | 188.29 | 189.54 |
| 96.50 | 205.88 | 190.64 | 190.64 | 24.43 | 205.89 | 201.51 |
| 98.00 | 210.90 | 195.79 | 195.79 | 28.31 | 210.90 | 212.94 |
| 99.00 | 212.48 | 197.59 | 197.59 | 29.53 | 212.48 | 215.99 |
| 100.00 | 214.05 | 199.38 | 199.38 | 30.75 | 214.05 | 217.57 |

COLD PROPERTIES

| True VP at 37.8 C | (psia) | --- | Cetane Index | | --- |
|---|---|---|---|---|---|
| Reid VP at 37.8 C | (psia) | --- | Research Octane Number | | 75.1685 |
| ASTM D93 Flash Point | (F) | --- | Viscosity at 37.8 C | (cP) | 0.22181 |
| ASTM D97 Pour Point | (F) | --- | Viscosity at 97.8 C | (cP) | 0.13240 |
| Refractive Index | | 1.3634 | | | |

P:N:A

| Paraffins [mol%] | 89.3668 | Naphthas [mol%] | 10.6332 | Aromatics [mol%] | 0.0000 |
|---|---|---|---|---|---|

FIG. 10F

METHODS AND APPARATUS FOR TREATING BITUMEN MIXTURES

RELATED APPLICATIONS

This application is a continuation of U.S. patent application Ser. No. 16/126,976, filed Sep. 10, 2018, which is a continuation-in-part of U.S. patent application Ser. No. 15/782,724, filed Oct. 12, 2017, which claims the benefit of the filing date of, and priority to, U.S. Provisional Patent Application No. 62/414,237, filed Oct. 28, 2016, the entire disclosures of which are hereby incorporated herein by reference.

BACKGROUND

Field of Inventions

The field of the inventions disclosed and/or claimed in this application and any resulting patent is the treatment of bitumen mixtures including particularly a type of bitumen composition known as "dilbit."

Description of Related Art

Dilbit is a composition made by mixing bitumen with diluent. Sufficient diluent is added to the bitumen so that the resulting bitumen composition has a viscosity low enough so that it may be easily transported through a pipeline. Thus the term dilbit as used herein means any blend resulting from the mixing of diluent and bitumen in an amount sufficient to lower the viscosity of the bitumen so that it can flow through a pipeline. In the past, various methods and apparatus have been disclosed, proposed, and used for treating dilbit including the methods and apparatus disclosed in the references appearing on the face of this patent, e.g., earlier patents and publications. However, it is contemplated that those prior methods and apparatus lack the specific combinations of steps and features described as being part of certain methods and apparatus herein. Furthermore, those prior methods and systems are contemplated as having various shortcomings; and at least certain embodiments of the methods and apparatus described herein overcome some of those shortcomings and problems. Also, certain methods and apparatus described have benefits that would be surprising and unexpected to a person of ordinary skill in the art who is familiar with the prior art existing at the time of inventions claimed herein but without the benefit of the disclosure herein.

SUMMARY

Certain methods disclosed herein include heating the low-viscosity bitumen composition in a fractionator at a selected operating temperature sufficient to provide a heavy fraction ("bottoms") with certain properties, discussed below, and a light fraction ("overhead"). The heavy fraction includes bitumen and also a certain portion of the original diluent that was previously mixed with the original bitumen to provide the low-viscosity bitumen composition (e.g., the dilbit) that was transferred through the pipeline.

Further, one or more embodiments disclosed herein include a method and apparatus for preparing a high-viscosity non-hazardous bitumen composition for transportation in a railcar, wherein the method may include the following steps, and the apparatus may include structures for performing the following: (a) providing to a fractionator system a low-viscosity bitumen composition previously residing in a pipeline having a first viscosity and comprising a miscible blend of hydrocarbons, which blend was prepared by mixing a first diluent composition comprising 95 or more wt. % light diluent hydrocarbons of C5 or less together with less than 5 wt. % heavy diluent hydrocarbons of greater than C5 with a first bitumen composition comprising light bitumen hydrocarbons of C5 or less together with heavy bitumen hydrocarbons of greater than C5; (b) heating the low-viscosity bitumen composition in the fractionator system to provide a first light fraction and a first heavy fraction, wherein: (i) the first light fraction comprises substantially all of the light diluent hydrocarbons and substantially all of the light bitumen hydrocarbons; and (ii) the first heavy fraction comprises substantially all of the heavy diluent hydrocarbons and substantially all of the heavy bitumen hydrocarbons; (c) removing at least a portion of the first heavy fraction from the fractionator system, wherein the first heavy fraction has a second viscosity that is higher than the first viscosity; (d) forming a high-viscosity non-hazardous bitumen composition from the at least a portion of the first heavy fraction; and (e) directing the high-viscosity non-hazardous bitumen composition to a railcar.

Further, one or more embodiments disclosed herein include a method and apparatus for preparing a high-viscosity non-hazardous bitumen composition for transportation in a railcar, wherein the method may include the following steps, and the apparatus may include structures for performing the following: (a) providing to a fractionator system a low-viscosity bitumen composition previously residing in a pipeline having a first viscosity and comprising a miscible blend of hydrocarbons, which blend was prepared by mixing a first diluent composition comprising 95 or more wt. % light diluent hydrocarbons of C5 or less together with less than 5 wt. % heavy diluent hydrocarbons of greater than C5 with a first bitumen composition comprising light bitumen hydrocarbons of C5 or less together with heavy diluent hydrocarbons of greater than C5; (b) heating the low-viscosity bitumen composition in the fractionator system to provide a first light fraction and a first heavy fraction, wherein: (i) the first light fraction comprises substantially all of the light diluent hydrocarbons and substantially all of the light bitumen hydrocarbons; and (ii) the first heavy fraction comprises substantially all of the heavy diluent hydrocarbons and substantially all of the heavy bitumen hydrocarbons; (c) removing at least a portion of the first heavy fraction from the fractionator system, wherein the first heavy fraction has a second viscosity that is higher than the first viscosity; (d) forming a high-viscosity non-hazardous bitumen composition from the at least a portion of the first heavy fraction; and (e) directing the high-viscosity non-hazardous bitumen composition to a railcar.

In accordance with one or more preferred embodiments, certain of the methods involve heating a low-viscosity bitumen composition in a fractionator that is operated at a specified distillation (fractionation) temperature, to provide a heavy fraction (bottoms) and a light fraction (overhead) with unexpectedly desirable properties.

The fractionation temperature is preferably no more than 450° F. (232° C.) but may also range as low as 335° F. (170° C.) and up to 450° F. (232° C.). By operating the distillation within that range, the heavy fraction that results from the distillation has an unexpectedly unique combination of desirable properties.

One unexpected benefit of using a fractionating temperature of 450° F. (232° C.) and below is that the heavy fraction, and also the resulting high-viscosity bitumen composition, has a desirable flash point (FP), namely, one that is sufficiently high to avoid a "hazardous" classification under applicable regulations. Specifically, when using a fractionating temperature of 450° F. (232° C.) and below, the heavy fraction has a flash point above about 201° F. (94° C.) (ASTM C3828), i.e., above 94° C. precisely or more broadly above the range of 93° C. or 95° C., and more preferably 210° F. (99° C.) or more, and even more preferably 235° F. (113° C.) or more.

For example, in at least one example, using a fractionating temperature of 450° F. (232° C.) can result in removal from the low-viscosity bitumen composition of hydrocarbons with final boiling points of approximately 314° F. (157° C.) (ASTM D86 FBP) and less (lower), and those removed hydrocarbons can be directed to a stabilizer as part of the light fraction, where the stabilizer is a second fractionator used to treat the light fraction leaving the first fractionator. The hydrocarbon components with final boiling points of 320° F. (160° C.) and less include substantially all the hydrocarbons that exist as gases at 25° C. (C1-C3) and also certain hydrocarbons in the C4-C6 range.

Also, by using a fractionating temperature within the range 335° F. (170° C.) and up to 450° F. (232° C.), substantially all of the C1-C6's can be removed from the low-viscosity bitumen composition as well as many of the C6s, but the fractionating temperature is sufficiently low so that certain valuable hydrocarbons (some of the C6's and substantially all of the C7+) are part of the heavy fraction and the resulting high-viscosity bitumen composition.

Yet another unexpected benefit of using a fractionating temperature of 450° F. (232° C.) and below is that the heavy fraction, and also the resulting high-viscosity bitumen composition that is subsequently directed to the railcar, can have a desirable initial boiling point (IBP). In a preferred embodiment, where a fractionating temperature of 450° F. (232° C.) or less is used, the resulting heavy fraction preferably has an initial boiling point (IBP) of 298° F. (148° C.) (ASTM D86) or higher. That initial boiling point is sufficiently high to avoid a "hazardous" classification under applicable regulations, which state that a hazardous commodity is one that has an initial boiling point (IBP) that is less than 95° F. (35° C.) (ASTM D86).

Another unexpected benefit of operating at a fractionation temperature of no more than 450° F. is that in addition to the heavy fraction and light fraction having the desired flammability and combustibility properties (i.e., such that they are non-hazardous), undue cracking of the heavier hydrocarbon components present in the low-viscosity bitumen composition is minimized or even avoided. In certain specific embodiments, a fractionating temperature above 450° F. (232° C.) can be used, but the fractionating temperature should not reach a point where substantial cracking of the heavier hydrocarbon components takes place. Thus, for certain bitumen compositions where flash point is not a concern a fractionating temperature of up to 455° F., or 460° F., or 465° F., or 470° F., or 475° F., or 480° F., or 485° F., or 490° F., or 500° F., or 505° F., or 510° F., or 515° F., or 520° F., or 525° F., or 530° F., or 535° F., or 540° F., or 545° F., or 550° F. may be used.

Yet another unexpected benefit of operating the fractionator at temperatures at 450° F. (232° C.) and below is avoidance of acid corrosion attacks on the column, piping systems and heat exchangers. It has been discovered that such acid corrosion attacks would otherwise be triggered as a result of the naphthenic acid contained in the low-viscosity bitumen composition existing at a particular temperature above 450° F. (232° C.). Such acid corrosion attacks can be devastating to fractionating equipment or at minimum can be detrimental to the mechanical integrity of such equipment, and can be advantageously avoided by limiting the fractionating temperature as stated herein.

Moreover, another unexpected benefit of limiting the fractionation temperature to no greater than 450° F. (232° C.) is that salt dissociation is minimized and in some cases avoided entirely. Consequently, the fractionating can advantageously be performed without the need to engage in de-salting, which could require substantial amounts of fresh water and also associated waste water disposal procedures. Thus, certain methods disclosed herein provide unexpected environmental benefits associated with using a fractionating temperature of up to 450° F. (232° C.). At that fractionating temperature and below, any minor salt dissociation and potential associated corrosion can be easily treated with anti-corrosion additives combined with an overhead water wash system to maintain the overhead condensing system. However, the amount of water required using the identified fractionation temperature is minimal when compared to the amount of water that would be required with more than insubstantial salt dissociation.

Yet another benefit of using a fractionating temperature of 450° F. (232° C.) and below is that the temperature of the heavy fraction exits the fractionator at a temperature that can be conveniently adjusted downward to 212° F. (100° C.) or below, before the heavy fraction enters the railcar as a high-viscosity bitumen composition with desirable non-hazardous temperature properties. Specifically, for example, heat can be transferred away from the both the heavy fraction and the light fraction exiting the fractionator and to the low-viscosity bitumen composition entering the fractionator, using cross-flow heat exchange, and a person having ordinary skill in the art will be familiar with heat exchangers that are commercially available for that purpose. For example, low-viscosity bitumen may leave the pipeline at 60° F. and enter a storage tank where it is maintained at approximately 60° F. The low-viscosity bitumen composition may then be directed through a conduit toward the fractionator, but first enters a shell-and-tube heat exchanger where it makes heat exchange contact with the heavy fraction that is exiting the fractionator at a temperature of (for example 210° F.), so that the temperature of the low-viscosity bitumen composition could be raised from 60° F. to 135° F. while the temperature of the heavy fraction could be lowered from 210° F. to 145° F. Then, the low-viscosity bitumen composition may be passed through another shell-and-tube heat exchanger where it makes heat exchange contact with the light fraction that could be exiting the fractionator at a temperature of (for example 396° F.), which could result in the temperature of the low-viscosity bitumen composition being raised from 135° F. to 267° F., and the temperature of the light fraction being lowered from 396° F. to 250° F. Of course, those temperatures are approximate only and would change depending on a number of factors including the type and configuration of the heat exchangers as well as the compositions of the different streams. Also, depending on the fractionation temperature and other factors, the temperature of the heavy fraction exiting the fractionator may have a temperature ranging from 220° F. (104° C.) to 300° F. (149° C.), and can be efficiently and economically lowered to a desirable temperature of 212° F. (100° C.) or less using cross-flow heat exchange with the incoming cold high-viscosity bitumen as described above. Accordingly, a substantial amount of heat can be removed from the heavy fraction by heat transfer through the walls of steel piping through which the heavy fraction passes en route to a storage facility prior to transfer to a railcar. In addition, artificial chilling can be included to supplement the heat transfer via the walls of the steel piping. This allows the cooled heavy fraction to be safely loaded into the railcars meeting the non-hazardous regulations.

The low-viscosity bitumen composition is preferably pre-heated, e.g., using cross-flow heat exchange, even before being directed to a fired heater that raises the temperature to a maximum of 450° F. after which time it is fed to the fractionator. As used herein, the fired heater may in certain embodiments be considered part of the fractionator even where it is physically outside of the fractionating column. By pre-heating, e.g., using heat transfer from the heavy and light fractions, the amount of fuel required for the fired heater is less than the amount of fuel without pre-heating, which also lowers the overall emissions from the system.

Also, in certain methods described herein, the first light fraction is subjected to fractionation in a separate fractionator (tower) at, for example, 250° F. (121.1° C.), to separate the first light fraction into a second light fraction (primarily off-gas) and a second heavy fraction (primarily liquid) that includes most of the components from the original diluent. In certain embodiments, this separate fractionator is referred to as a "stabilizer."

Unexpectedly, a high-viscosity non-hazardous bitumen composition with specific properties can be formed from the heavy fraction, e.g., where the high-viscosity non-hazardous bitumen composition qualifies as a non-hazardous commodity pursuant to HMR/TDG regulations. The high-viscosity non-hazardous bitumen composition is not classified as flammable under those regulations, i.e., DOT/TDG Dangerous Goods Class 3. That is, it does not have an Initial Boiling Point (IBP) of 95° F. (35° C.) or less at an absolute pressure of 101.3 kPa and thus does not fall under DOT/TDG Dangerous Goods Class 3, Packing group 1. It does not have an IBP greater than 95° F. at an absolute pressure of 101.3 kPa in combination with any flash point less than 73° F. (e.g., gasoline or acetone) and thus does not fall under DOT/TDG Dangerous Goods Class 3, Packing group 2. It does not have an IBP greater than 95° F. together with a closed-cup flash point between 73° F. and 140° F. and thus does not fall under DOT/TDG Dangerous Goods Class 3, Packing group 3. The composition is also not combustible. That is, it does not have an IBP greater than 95° F. together with a closed-cup flash point between 140° F. and 200° F. It is not poison and thus does not fall under DOT/TDG Dangerous Goods Class 6.1. More specifically, it does not qualify as a toxic substance pursuant to DOT/TDG 6.1a in that it is not liable to cause death or serious injury to human health if inhaled, swallowed, or absorbed by the skin (e.g., potassium cyanide or mercuric chloride) and specifically does not include any or at least dangerous levels of benzene. It does not qualify as a toxic substance pursuant to DOT/TDG 6.1b in that it is not harmful to human health (e.g., pesticides or methylene chloride, wherein any hydrogen sulfide H2S is removed pursuant to certain versions of the method. Furthermore, the high-viscosity non-hazardous bitumen composition is not corrosive and thus does not fall under DOT/TDG Dangerous Goods Class 8. More specifically it has no acids (e.g., sulfuric acid or hydrochloric acid) and thus does not fall under DOT/TDG Dangerous Goods Class 8.1 and also has no Alkalis (e.g., potassium hydroxide or sodium hydroxide) and thus does not fall under DOT/TDG Dangerous Goods Class 8.2. Also, when the composition is chilled to 100° C. or below and placed in the railcar it does not qualify as an Elevated Temperature hazardous commodity under DOT/TDG Dangerous Goods Class 9, which is defined as any liquid transported at a temperature of greater than 100° C. During transportation, because no additional heat is added to the composition while in the rail car, the temperature of the composition will not exceed 100° C.

Preferably, unlike other treatment processes in which the diluent itself is described as being removed from the dilbit, the fractionations disclosed herein are operated so that certain selected hydrocarbon components from the original diluent remain with the heavy fraction and the heavy fraction has specific non-hazardous properties as specified herein. Preferably at least 2 volume % of the original diluent components that were added to the original bitumen composition to form the dilbit remain as part of the heavy fraction. Alternatively, as much as 2-5 volume % or 6-10 volume % or 5-15 volume % or 5-20 volume percent of the original diluent components may be selected to remain with the heavy fraction. However, any heavy fraction that includes some of the original diluent components should have the flash points and initial boiling points specified herein.

BRIEF DESCRIPTION OF THE DRAWINGS

FIG. 6A is a heat and material balance for the process depicted in FIG. 5.

FIGS. 6B1 and 6B2 is a table showing the compositions of selected streams in FIG. 5.

FIG. 6C is a boiling point curve chart for the heavy fraction composition in FIG. 5.

FIG. 6D is a boiling point curve chart for the stabilized diluent composition in FIG. 5.

FIG. 6E is a boiling point curve chart for the off-gas composition in FIG. 5.

FIG. 8A is a heat and material balance for the process depicted in FIG. 7.

FIGS. 8B1 and 8B2 is a table showing the compositions of selected streams in FIG. 7.

FIG. 8C is a boiling point curve chart for the heavy fraction compositions in FIG. 7.

FIG. 8D is a boiling point curve chart for the diluent compositions in FIG. 7.

FIG. 8E is a boiling point curve chart for the fuel gas compositions in FIG. 7.

FIG. 8F is a boiling point curve chart for the recovered hydrocarbon composition in FIG. 7.

FIG. 10A is a heat and material balance for the process depicted in FIG. 9.

FIGS. 10B1 and 10B2 is a table showing the compositions of selected streams in FIG. 9.

FIG. 10C is a boiling point curve chart for the heavy fraction compositions in FIG. 9.

FIG. 10D is a boiling point curve chart for the diluent compositions in FIG. 9.

FIG. 10E is a boiling point curve chart for the fuel gas compositions in FIG. 9.

FIG. 10F is a boiling point curve chart for the recovered hydrocarbon composition in FIG. 9.

DETAILED DESCRIPTION

1. Introduction

Figure 1:
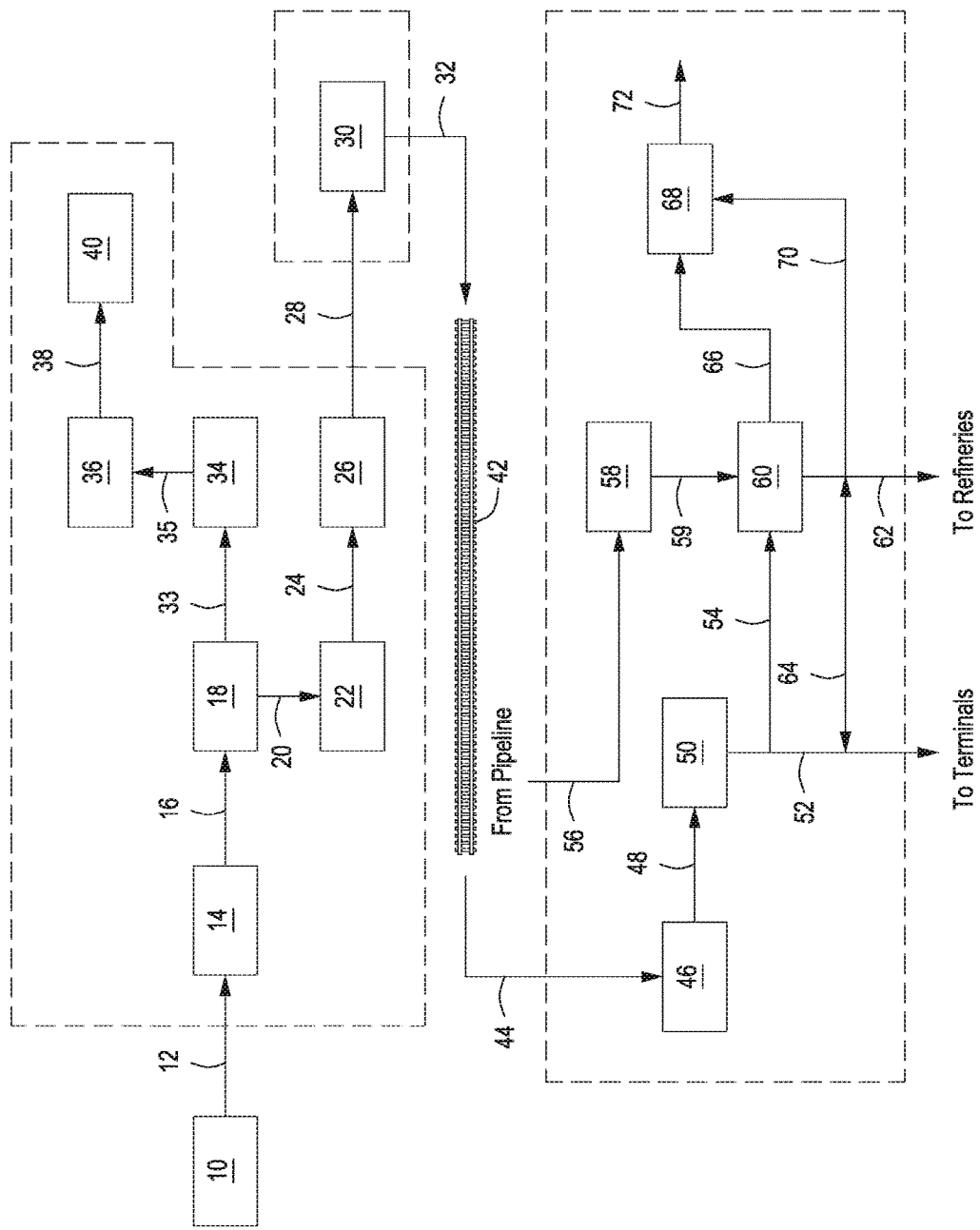
FIG. 1 is an illustrative flow chart.

A detailed description will now be provided. The purpose of this detailed description, which includes the drawings, is to satisfy the statutory requirements of 35 U.S.C. § 112. For example, the detailed description includes a description of the inventions and sufficient information that would enable a person having ordinary skill in the art to make and use the inventions defined by the claims. In the figures, like elements are generally indicated by like reference numerals regardless of the view or figure in which the elements appear. The figures are intended to assist the description and to provide a visual representation of certain aspects of the subject matter described herein. The figures are not drawn to scale, nor do they show all the structural details of the systems, nor do they limit the scope of the claims.

Any claim that is included in this or a subsequent application or resulting patent defines a separate invention which, for infringement purposes, is recognized as including equivalents of the various elements or limitations specified in the claims. Depending on the context, all references herein to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

2. Selected Definitions

Certain claims may include one or more of the following terms which, as used herein, are expressly defined below.

The term "dilbit" as used herein means any composition that is a blend resulting from the mixing of diluent and bitumen in an amount sufficient to lower the viscosity of the bitumen so that it can flow through a pipeline. At least one publication has stated that according to the Canadian Association of Petroleum Producers dilbit is a bitumen blend consisting of diluent that has a density of less than 800 kg/m3 (45 degrees API), and that any bitumen blend made from a diluent with a density greater than or equal to 800 kg/m3 is a "synbit" because it is assumed that the diluent is synthetic crude oil. However, for convenience the term "dilbit" as used herein includes synbit unless specified otherwise.

The term "blend" as used herein means a homogenous mixture which is preferably a single-phase system in which any diluent composition and bitumen composition used to prepare the mixture are fully miscible with one another.

The term "component" as used herein refers to a particular class of hydrocarbons, depending on the type or component specified. For example, a "hydrocarbon component" refers to a particular class of hydrocarbon molecules based on the number of carbon atoms. For example, a particular hydrocarbon component may comprise, consist or consist essentially or hydrocarbons having all or primarily the same number of carbon atoms or a particular hydrocarbon component may comprise, consist, or consist essentially of hydrocarbon molecules having a particular range of number of carbon atoms. For example, one hydrocarbon component may consist essentially of pentanes and pentenes, each of which have five carbon atoms and are sometimes referred to as C5's. Another hydrocarbon component may consist or consist essentially or hydrocarbon molecules that have a particular range of carbon atoms, e.g., C5+, which are all hydrocarbon molecules having five or more carbon atoms, and which include pentanes, pentenes, hexanes, hexenes, etc. The term component when used in the context of fractionation may also refer to a molecule that has particular initial and final boiling points and flash point, and may be referred to specifically as an "initial boiling point component," which is all hydrocarbons having an initial boiling point of a particular temperature and below, "final boiling point component," which is all hydrocarbons having a final boiling point of a particular temperature and below, and "flash point component," which is all hydrocarbons having a flash point of a particular temperature and below. The term bitumen component(s) refers to any group of hydrocarbons that were part of the original bitumen that was mixed with the original diluent to form the dilbit. The term diluent component(s) refers to any group of hydrocarbons that were part of the original diluent that was mixed with the original bitumen to form the dilbit.

The term "liquid" as used herein means any material that is neither gas nor solid and that flows freely at the particular temperature and pressure existing at the time it is being referred to. Most of not all of the compositions referenced herein are regarded as liquid even though some of the highly viscous bitumen compositions do not flow as freely as others.

The term "bitumen" is defined herein according to its broadest published definition or usage as that term appears in at least one patent or published article. Bitumen is a naturally occurring form of petroleum that is a by-product of decomposed organic materials and in its natural state is often found impregnated in sand, e.g., bituminous sands, oil sands, and tar sands. Hydrocarbon molecules account for over 90 percent of the weight of bitumen, and range from light alkanes, such as ethane, to long-chain compounds with relatively high molecular weights and boiling points, including asphaltenes which often account for up to 20 percent of the total weight of the bitumen.

The term "composition" means any liquid, gaseous, or solid material that contains hydrocarbons, including a bitumen composition that includes at least bitumen and a diluent composition that includes at least diluent.

The term "bitumen composition" means any material that includes bitumen either alone or in combination with some other material that has been added to the bitumen, e.g., diluent. A diluent composition as that term is used herein refers to diluent either alone or after being mixed with some other material, but does not include diluent mixed with bitumen.

The term "diluent" as used herein means any hydrocarbon composition that when added to a bitumen composition including the original bitumen the resulting mixture has a lower viscosity than the viscosity of the bitumen composition or the original bitumen prior to the addition of the diluent. Examples of diluents are naphtha-based oils, including natural gas condensate. Other diluents are light oils that have low densities (<750 kg/m3), high API gravities (>60 degrees), and low viscosities (<1 cSt at room temperature). Synthetic crude oils have higher densities than natural gas condensate, e.g., 825 to 875 kg/m3), lower API gravities (30 to 40 degrees), and higher viscosities (5 to 20 cSt). A diluent composition can be a mixture of diluent with some other material that might not strictly be considered a diluent. As the term is used herein, for example, a diluent composition may be a naphtha-based condensate, wherein a low-viscosity bitumen composition is made by mixing 7 parts by volume of a bitumen composition and up to 3 parts by volume of a diluent composition, and although the mixture may be considered to be 70 percent by volume bitumen and 30 percent by volume diluent, the resulting mixture is a one-phase homogenous system. Another diluent composition referenced herein in a synthetic crude oil diluent, in which case the diluent is synthetic rather than naturally occurring, and in at least one method herein the low-viscosity bitumen composition is made from one part by volume (50 volume %) of a bitumen composition and one part by volume (50 volume %) of a diluent composition. Diluents in most cases contain components that have similar boiling ranges to full range naphthas (C5-C10) and are suitable for processing with this type of apparatus. The term "diluent" also includes natural gasoline.

The term "fractionator," which may be synonymously referred to herein as "fractionator structure" or "fractionator system" means, as used herein, any structure (which may be a combination of sub-structures) capable of being used to apply heat to any type of hydrocarbon and as a result of the application of heat, creating at least two different hydrocarbon fractions having different boiling points. The structure may include or be a fractionating column capable of being used to apply heat to a dilbit composition resulting in a light fraction and a heavy fraction. At least one type of fractionator is one or more separation towers, which may also be referred to as distillation towers. An "atmospheric separation tower" is one that is operated at atmospheric pressure conditions. In certain methods herein a fractionator includes at least two atmospheric separation towers operating at 232° C. to provide a light fraction and a heavy fraction. Thus, for example, each of those towers is operated with heat applied to a bitumen composition so that the temperature of the composition reaches 232° C. at atmospheric pressure and results in at least two fractions being produced. The fired heater that heats the incoming feed stream is considered part of the fractionator unless the context requires that it is separate from the fractionator.

The term "chiller" as used herein means any conventional structure or device that is capable of removing heat from the bitumen composition, e.g., via a vapor-compression or absorption refrigeration cycle, but excluding the conduit through which the bitumen composition is flowing or any other device or structure that results in heat transfer unaided by mechanical or other artificial devices. For example, although heat from a bitumen composition is capable of being transferred through the walls of a pipe while the bitumen composition is flowing through the pipe, the pipe itself is not considered a "chiller" as that term is used herein.

The terms "pipe" and "conduit" as used herein mean any type of pipe or conduit, including a pipeline as well as a smaller-diameter cylindrical pipe or conduit leading from a pipeline to a fractionator.

The term "inlet" as used herein means any opening or structure having an opening through which liquid or gaseous material is capable of passing toward or into a particular vessel or other structure.

The term "outlet" as used herein means any opening or structure having an opening through which liquid or gaseous material is capable of passing out of or away from a particular vessel or other structure.

The term "provides" as used herein is a verb that means handle, hold, store, supply, or transport (also verbs), and encompasses receiving a highly viscous dilbit composition from a pipeline and/or transporting it in the direction of a fractionator. For example at least one of the methods disclosed herein includes providing to a fractionator system a low-viscosity bitumen composition previously residing in a pipeline, in which case the providing includes pumping through a conduit.

The term "transport" as used herein is a verb that specifically means provide movement, e.g., movement through a pipe.

The term "corresponds to" as used herein is defined as related to or associated with, e.g., be similar, analogous, or equivalent to.

The term "coupled" as used herein is defined as attached, joined to, fastened together, or affixed to, directly or indirectly. An object may be coupled to another object by, for example, welding, gluing, screwing, etc.

The term "positioning" as used herein is defined as putting in a particular place, arrangement, and/or orientation.

The term "between" as used with regard to position is defined as occupying the space or interval that separates, or more broadly being in intermediate relation to spatially or functionally. For example, a point is positioned spatially between two other objects if a line connecting any surface of the first object to the second object passes through the point. An object positioned between two surfaces would be intersected at least one line connecting a point on the first surface to a point on the second surface. The term "between" as used with regard to comparing objects is defined as serving to connect or unite in a relationship. For example, the difference in thickness between two objects involves comparing the thicknesses of the two objects. However, a joint elbow section is considered functionally "between" two straight sections of pipe that are at right angles to one another because the joint elbow section provides an intermediate point for fluid passing from one pipe section to the other pipe section.

The term "adjacent" as used herein is defined as nearby, and may include direct or indirect contact, but does not require physical contact.

The term "with respect to" as used herein is defined as in reference to or having any discernible relationship to. A first object may be oriented with respect to a second object when the first object is placed facing a certain direction or in a certain position relative to the second object. For example, a first object may be positioned facing away from a second object while facing towards a third object and be positioned with respect to both the second and third objects.

The term "non-hazardous" as used herein with reference to any composition refers to a composition that is not "hazardous" under any legal or administrative regulations, including a material that does not qualify as a Hazardous Commodity under any regulations of the DOT/TDG regulations, which include definitions of Dangerous Goods under those regulations. The term DOT refers to the Department of Transportation and TDG refers to Transportation of Dangerous Goods.

The term "viscosity" is a general term that means thickness of a fluid, where the more viscous a composition is the more slowly it flows through a pipeline with a given amount of force behind it compared with a less viscous composition which flows through that same pipeline more quickly with the same amount of force behind it. There are different types of viscosities. When used quantitatively herein, the term viscosity means dynamic viscosity of a liquid, for which the unit of measurement is the centistoke (cSt), which is the ratio of dynamic viscosity to fluid density. Dynamic viscosity is also referred to as kinematic viscosity. At room temperature the dynamic of kinematic viscosity of pure bitumen will exceed 100,000 cSt, compared with about 25 cSt for medium-density crude. An example of a low-viscosity bitumen composition is one with viscosity of 350 centistokes (cSt) or less. Viscosity is a relative measurement and is highly temperature dependent. Viscosities discussed in this application are based on a common 20° C. temperature for comparison purposes. Viscosity as expressed quantitatively herein is measured using ASTM D-7042.

The term "low-viscosity" is a relative term that means any viscosity that is lower than any other viscosity referenced in the same context. Similarly, the term high-viscosity is a relative term that means any viscosity that is higher than any other viscosity referenced in the same context. For example, a "low-viscosity composition" has a lower viscosity than a "high-viscosity" composition in one context, and the same composition that is a "high-viscosity' composition in that context may be a "low-viscosity" composition in another context, e.g., in the context of a material having an even higher viscosity. Examples of low-viscosity bitumen compositions are those treated in accordance with certain methods disclosed herein, and may comprise, consist, or consist essentially of a miscible blend of hydrocarbons. Before being treated such compositions may reside in pipelines through which they are able to easily flow due to their low viscosity. Such compositions may include "dilbit," defined as any miscible blend of diluent and bitumen. In certain methods disclosed herein, the low-viscosity bitumen compositions have a desired viscosity, e.g., a "first viscosity," and prior to residing in the pipeline are prepared by mixing a diluent, e.g., a first diluent composition that may include 95 or more wt. % light diluent hydrocarbons, e.g., hydrocarbons that are C5 or lighter (e.g., C4s) with a bitumen, which may also have a much-lesser proportion of C5 hydrocarbons or lighter, e.g., less than 5 wt. % heavy diluent hydrocarbons that are C5+.

When referring to different viscosities, the terms "first viscosity" and "second viscosity" are sometimes used herein. In the context of a particular method or apparatus, those terms refer to viscosities that are different from one another, and the first viscosity preferably refers to the viscosity of a material in an upstream part of the method (process), relative to a second viscosity which refers to a viscosity of a material in some downstream part of the method, e.g., after a bitumen composition having a particular viscosity is treated by fractionation resulting in a bitumen composition having a higher viscosity. The terms first viscosity and second viscosity refer to two different viscosities and do not themselves imply anything about numerical value, sequence, importance, priority, etc. For example, although high viscosity and low viscosity necessarily imply that the former is numerically higher than the latter, a first viscosity and a second viscosity do not carry that same implication.

The term "heating" means applying heat to an extent the temperature of the material being heated increases.

The term "fraction" means any part of a bitumen composition that is separated from any other part of that composition as a result of heat being applied to the composition, e.g., during a fractionating or distillation process, and includes a light fraction and a heavy fraction.

The term "light fraction" is a relative term that means any fraction that has a lower initial boiling point than any other fraction referenced in the same context. Similarly, the term heavy fraction means any fraction that has a higher initial boiling point than any other fraction referenced in the same context. The terms light fraction and heavy fraction as used herein each describe a fraction that results from fractionation.

The term "removing" means taking away from, and includes directing a light fraction away from a bitumen composition after being heated, e.g., during a fractionation process, and also includes directing a heavy fraction away from the same bitumen composition after the same heating step. For example, at least one method disclosed herein includes removing at least one portion of one of the fractions, preferably a portion of the first heavy fraction from the fractionator system. Also, any conventional treatment method may be used to remove hydrogen sulfide (H2S) from any material herein, e.g., a low-viscosity bitumen composition, e.g., prior to providing a first light fraction and a first heavy fraction, or from the first heavy fraction.

The "boiling point of a liquid" is the temperature at which the vapor pressure of the liquid equals the environmental pressure surrounding the liquid. A liquid in a vacuum environment has a lower boiling point than when the liquid is under atmospheric pressure. A liquid in high pressure environment has a higher boiling point than when the liquid is at atmospheric pressure. In other words, the boiling point of liquids varies with and depends upon the surrounding environmental pressure. The boiling point of a substance is the temperature at which it can change from a liquid to a gas throughout the bulk of the liquid. Generally speaking, the boiling point of the lighter hydrocarbons is lower than the boiling point of the heavier hydrocarbons, in the sense that "lighter" and "heavier" refer to the molecular weight of the particular hydrocarbon molecule or hydrocarbon component. Thus, for example, a C1-C4 hydrocarbon component is lighter than a C5-C10 component, and a C1-05 component is also lighter than a C5-C10 component even though certain molecules in each component are the same, and boil at the same temperature, i.e., C5's.

The term "initial boiling point" (IBP) as used herein means the temperature at which a particular material begins to boil under specified conditions, e.g., at a particular pressure. Generally, in a laboratory setting (and per the ASTM tests), the initial boiling point is the temperature at which the first drop of distillate appears after distillation in the particular ASTM-designated apparatus. For example, an initial boiling point (IBP) of certain materials disclosed herein are greater than or equal to 234.8° C. (ASTM D86), which means that the initial boiling point of the material is measured in accordance with the ASTM D86 test procedure, which specifies a pressure at which the boiling point is measured. In certain methods a specified heavy fraction may also have an initial boiling point (IBP) greater than or equal to 234.8° C. (ASTM D86).

The term "final boiling point" (FBP) as used herein is a temperature according to a particular ASTM procedure which specifies a particular apparatus and conditions, and is the maximum temperature observed on the distillation thermometer when a standard ASTM distillation is carried out. Whenever FBP is specified quantitatively herein, ASTM-D86 is followed.

The term "flash point" (FP) as used herein means the lowest temperature at which vapors in a particular material will ignite, given an ignition source. For example, a flash point (FP) of certain materials disclosed herein, e.g., certain high-viscosity bitumen compositions, should be greater than or equal to 103° C. (ASTM D93), which refers to a flash point measured in accordance with the ASTM D93 test procedure, using the closed-cup methodology. That same material, or another material, may also be defined as having a flash point of 113° C. (ASTM D3828), which refers to a flash point measured in accordance with the ASTM D3828 test procedure. In certain methods, the initial boiling point and flash point are both measured for a particular composition. For example, a heavy fraction resulting from a fractionation may have a viscosity that is higher than the viscosity of the bitumen composition fed to the fractionator, an initial boiling point (IBP) greater than or equal to 234.8° C. (ASTM D86) and flash points greater than or equal to 103° C. (ASTM D93) and 113° C. (ASTM D3828).

The term "forming" means any act(s) of making, and also includes any act(s) of manipulating, directing, adjusting, or modifying a material such that the properties or location of the material are changed, including mixing, heating or chilling. For example, forming a high-viscosity non-hazardous bitumen composition from at least a portion of the first heavy fraction includes transporting the heavy fraction from one place to another, and may also include chilling the heavy fraction.

The term "directing" means causing the change of position of something, either actively, by pumping, opening a valve, or providing a conduit that provides a path from one place to another. For example, at least one way to cause the directing of material, e.g., a high-viscosity non-hazardous bitumen composition to some location, e.g., a railcar, is by providing a conduit, e.g., a pipe, through which the composition is capable of flowing.

The term "heating" means applying energy, preferably in the form of heat, to something in an amount sufficient to increase its temperature and preferably, in the context of the methods disclosed herein, to result in separation of different components of compounds that have different boiling points. For example, at least one method includes heating a low-viscosity bitumen composition in a fractionator system to provide a first light fraction and a first heavy fraction.

The term "substantially all" means at least 98 wt. % unless indicated otherwise. For example, in certain methods a material is heated to provide, e.g., result in, a first light fraction that comprises substantially all of the light diluent hydrocarbons and also substantially all of the light bitumen hydrocarbons, where the light diluent hydrocarbons and the light bitumen hydrocarbons may be selected by the operator depending on the fractionation "cut" in the overheads, and is preferably all or substantially all of the C5 compounds, or lighter at least 50 mol % of the C6's and none or essentially none of the C7+'s. Additionally, in at least certain methods, the heating of certain material results in a "bottoms" fraction that may be referred to as a first heavy fraction that includes substantially all of the heavy diluent hydrocarbons and substantially all of the heavy bitumen hydrocarbons, where the heavy diluent hydrocarbons and the heavy bitumen hydrocarbons may be selected by the operator depending on the fractionation "cut" in the bottoms, and is preferably all or substantially all of the C7+ compounds, some but less than 50 mol % of the C6's and none or essentially none of the C5's or lighter.

The term "parallel" when applied to how two or more separation towers operate or are capable of operating means that each tower has an inlet through which substantially the same type of bitumen composition flows, e.g., dilbit flowing from the same pipeline, and also two different outlets through one of which flows the same or substantially the same heavy fraction and the other of which flows the same of substantially the same light fraction. The heavy fraction flowing from each of the towers operating in parallel preferably have the same viscosity, density, Initial Boiling Point and/or Flash Point and preferably also the same proportion of compounds, e.g., the C5+ fraction. For example, in at least one method, a fractionator system includes at least two separation towers operating in parallel with one another wherein each tower includes an input conduit through which flows at least a portion of the low-viscosity bitumen composition and an output conduit through which flows at least a portion of the first heavy fraction.

The term "light diluent hydrocarbons of C5 or less" means hydrocarbon molecules (also referred to as hydrocarbon compounds) having five carbon atoms (pentanes and pentenes) or less (including butane for example), and may also be referred to as C5-.

The term "heavy diluent hydrocarbons greater than C5" means hydrocarbon molecules (also referred to as hydrocarbon compounds) having more than five carbon atoms (e.g., hexanes, octanes, etc. and does not include any C5 compound. However any reference to C5+ means hydrocarbon molecules with five carbon atoms plus any molecules with more than five carbon atoms.

The terms "weight percent" and "wt. %" mean percent by weight. For example, a high-viscosity non-hazardous bitumen composition produced in accordance with certain methods herein may have less than 1.0 weight % of C5-, which means that less than 1.0 percent of the weight of the material is a C5 molecule or lighter. Similarly, "volume percent" (vol. %) means percent by volume. For example, a dilbit composition that is 30 percent by volume diluent and 70 volume percent bitumen is made from 30 parts by volume diluent and 70 parts by volume bitumen.

The term "chilling" means removing energy, preferably heat, from something to the extent that the temperature of the thing from which heat is removed is lowered, as a result of the act of chilling. For example, forming a high-viscosity non-hazardous bitumen composition may include chilling at least a portion of the heavy fraction, by passing that composition through a chiller, which may be a heat exchanger such as a conventional shell-and-tube heat exchanger. Certain methods includes chilling at least a portion and preferably all, of a heavy fraction to a temperature less than 100 degrees C. and such heavy fraction is preferably a high-viscosity non-hazardous bitumen composition.

The term "placing" means any act of moving or transferring. For example, at least one of methods herein includes placing the high-viscosity composition non-hazardous bitumen composition in the railcar while the high-viscosity composition is at a temperature of 100 degrees C. or less.

The term "batch method" means a fractionation method in which all of a particular "batch" or quantity of input material, e.g., low-viscosity bitumen composition, is subjected to fractionation resulting in one quantity of one fraction (e.g., light fraction) and another quantity of another fraction (e.g., heavy fraction), before another quantity of input material is subjected to fractionation in the same fractionator. For example, in at least one batch method a low-viscosity composition is heated in the fractionator system to provide a first light fraction and a first heavy fraction; then the first light fraction is heated in another fractionator system to provide a second light fraction. In contrast, a "continuous method" is a fractionation method in which a stream of input material is continuously fed to a fractionator, resulting in a continuous stream of light fraction and a continuous stream of heavy fraction, and that there is no set or pre-determined "batch" of input material.

3. Certain Specific Embodiments

Now, certain specific embodiments are described, which are by no means an exclusive description of the inventions. Other specific embodiments, including those referenced in the drawings, are encompassed by this application and any patent that issues therefrom.

One or more embodiments disclosed herein include a method and apparatus for preparing a high-viscosity non-hazardous bitumen composition for transportation in a railcar, wherein the method may include the following steps, and the apparatus may include structures for performing the following: (a) providing to a fractionator system a low-viscosity bitumen composition previously residing in a pipeline having a first viscosity and comprising a miscible blend of hydrocarbons, which blend was prepared by mixing a first diluent composition comprising 95 or more wt. % light diluent hydrocarbons of C5 or less together with less than 5 wt. % heavy diluent hydrocarbons of greater than C5 with a first bitumen composition comprising light bitumen hydrocarbons of C5 or less together with heavy bitumen hydrocarbons of greater than C5; (b) heating the low-viscosity bitumen composition in the fractionator system to provide a first light fraction and a first heavy fraction, wherein: (i) the first light fraction comprises substantially all of the light diluent hydrocarbons and substantially all of the light bitumen hydrocarbons; and (ii) the first heavy fraction comprises substantially all of the heavy diluent hydrocarbons and substantially all of the heavy bitumen hydrocarbons; (c) removing at least a portion of the first heavy fraction from the fractionator system, wherein the first heavy fraction has a second viscosity that is higher than the first viscosity; (d) forming a high-viscosity non-hazardous bitumen composition from the at least a portion of the first heavy fraction; and (e) directing the high-viscosity non-hazardous bitumen composition to a railcar.

One or more embodiments disclosed herein include a method and apparatus for preparing a high-viscosity non-hazardous bitumen composition for transportation in a railcar, wherein the method may include the following steps, and the apparatus may include structures for performing the following: (a) providing to a fractionator system a low-viscosity bitumen composition previously residing in a pipeline having a first viscosity and comprising a miscible blend of hydrocarbons, which blend was prepared by mixing a first diluent composition comprising 95 or more wt. % light diluent hydrocarbons of C5 or less together with less than 5 wt. % heavy diluent hydrocarbons of greater than C5 with a first bitumen composition comprising light bitumen hydrocarbons of C5 or less together with heavy diluent hydrocarbons of greater than C5; (b) heating the low-viscosity bitumen composition in the fractionator system to provide a first light fraction and a first heavy fraction, wherein: (i) the first light fraction comprises substantially all of the light diluent hydrocarbons and substantially all of the light bitumen hydrocarbons; and (ii) the first heavy fraction comprises substantially all of the heavy diluent hydrocarbons and substantially all of the heavy bitumen hydrocarbons; (c) removing at least a portion of the first heavy fraction from the fractionator system, wherein the first heavy fraction has a second viscosity that is higher than the first viscosity; (d) forming a high-viscosity non-hazardous bitumen composition from the at least a portion of the first heavy fraction; and (e) directing the high-viscosity non-hazardous bitumen composition to a railcar.

In any of the methods or apparatus disclosed herein the first viscosity of the low-viscosity bitumen composition may be 350 cSt or less, at 20° C. and the second viscosity of the high-viscosity bitumen composition may be 10,000 cSt or above, at 20° C.

In any of the methods or apparatus disclosed herein the low-viscosity bitumen composition may have a density of 940 kg/m3 or less (20 degrees API gravity).

In any of the methods or apparatus disclosed herein the fractionator may include at least two atmospheric separation towers each operating at a selected temperature such as 232° C. to provide the first light fraction and the first heavy fraction. More broadly, the fractionator system may include at least two atmospheric separation towers each operating at a selected temperature of 170° C. to 232° C. to provide the first light fraction and the first heavy fraction.

In any of the methods or apparatus disclosed herein the fractionator may include at least two atmospheric separation towers operating in parallel with one another wherein each tower includes an input conduit through which flows at least a portion of the low-viscosity bitumen composition and an output conduit through which flows at least a portion of the first heavy fraction.

Any of the methods or apparatus disclosed herein may additionally comprise removing H2S from the low-viscosity bitumen composition prior to providing a first light fraction and a first heavy fraction, or from the first heavy fraction.

In any of the methods or apparatus disclosed herein the first diluent composition comprises light diluent hydrocarbons of C6 or less and heavy diluent hydrocarbons greater than C6 and the first bitumen composition also comprises light bitumen hydrocarbons of C6 or less and heavy diluent hydrocarbons greater than C6; the first light fraction comprises substantially all of the light diluent hydrocarbons and substantially all of the light bitumen hydrocarbons; and the first heavy fraction comprises substantially all of the heavy diluent hydrocarbons and substantially all of the heavy bitumen hydrocarbons.

In any of the methods or apparatus disclosed herein the first heavy fraction may have an Initial Boiling Point (IBP) of 148° C. or more at an absolute pressure of 101.3 kPa (ASTM D86).

In any of the methods or apparatus disclosed herein the first heavy fraction may have a Flash Point greater than 94° C. (ASTM D3828).

In any of the methods or apparatus disclosed herein the high-viscosity non-hazardous bitumen preferably qualifies as a non-hazardous commodity pursuant to HMR/TDG regulations, having an Initial Boiling Point (IBP) greater than or equal to 95° F. (35° C.) and a Flash Point (FP) greater than or equal to 200° F. (93° C.).

In any of the methods or apparatus disclosed herein the first diluent composition may be a naturally-occurring field condensate, or a naphtha-based condensate, and the low-viscosity bitumen composition referenced herein may be composed of 70 volume % of the first bitumen composition and 30 volume % of the first diluent composition that is a naphtha-based condensate. More broadly, when the first diluent composition is a naturally-occurring field condensate or a naphtha-based condensate, the low-viscosity bitumen composition may be composed of from 70-80 volume % of the first bitumen composition and 20-30 volume % of the first diluent composition.

In any of the methods or apparatus disclosed herein the first diluent composition may be a synthetic crude oil diluent, and the low-viscosity bitumen composition referenced herein may be composed of 50 volume % of the first bitumen composition and 50 volume % of the first diluent composition that is a synthetic crude oil diluent provided the synthetic diluent contains components within a C5-C10 boiling range. More broadly, when the first diluent composition is a synthetic crude oil diluent that contains components within a C5-C10 boiling range, the low-viscosity bitumen composition may be composed of 45-55 volume % of the first bitumen composition and 45-55 volume % of the first diluent composition.

In any of the methods or apparatus disclosed herein the high-viscosity non-hazardous bitumen composition may contain less than 1.0 weight % of C5's or lighter compounds, including C4's, or less than 0.05 weight % C5's or lighter compounds, including C4's.

In any of the methods or apparatus disclosed herein the percentage of C5+'s in the high-viscosity non-hazardous bitumen composition may be higher than the percentage of C5+'s in the first bitumen composition, wherein a certain amount of the C5+'s are from the diluent.

In any of the methods or apparatus disclosed herein the forming of the high-viscosity non-hazardous bitumen composition may include chilling at least a portion of the heavy fraction, and preferably all the heavy fraction. Preferably the forming step includes the heavy fraction to a temperature less than 100 degrees C.

In any of the methods or apparatus disclosed herein the directing of the high-viscosity non-hazardous bitumen composition to a railcar includes placing the high-viscosity composition non-hazardous bitumen composition in the railcar while the high-viscosity composition is at a temperature less than 100 degrees C.

In any of the methods or apparatus disclosed herein the fractionator system (fractionator) may include either a single distillation tower or multiple distillation towers.

Any of the methods disclosed herein may be operated as a batch method, and any of the apparatus disclosed herein may be configured to operate using a batch method.

In any of the methods or apparatus disclosed herein, after the low-viscosity composition is heated in the fractionator system to provide a first light fraction and a first heavy fraction, the first light fraction may be heated in another fractionator system to provide a second light fraction.

Any of the methods or apparatus disclosed herein may additionally include heating the first light fraction in a fractionator to provide a second light fraction and a second heavy fraction, then directing the second heavy fraction to a collection vessel, wherein the second heavy fraction includes substantially all of the C5+ components in the first light fraction.

In any of the methods or apparatus disclosed herein wherein the method is a batch method, a first batch may consist essentially of a low-viscosity bitumen composition that is heated to provide a second batch that consists essentially of a high-viscosity non-hazardous bitumen composition, wherein the volume of the first batch may be greater than the volume of the second batch, and the volume of the second batch may be sufficient to fill up a railcar.

Any of the methods disclosed herein may additionally include adding at least a portion of the second light fraction to the low-viscosity bitumen composition before or during the heating of the low-viscosity bitumen composition to provide the first light fraction.

In any of the methods or apparatus disclosed herein the method may be continuous method in which providing low-viscosity bitumen composition to the fractionator system comprises providing a continuous stream of the low-viscosity bitumen composition to the fractionator system and directing a continuous stream of the first heavy fraction from the fractionator system to one or more storage tanks.

In any of the methods or apparatus disclosed herein the method may be a continuous method in which a stream of low-viscosity bitumen composition is fed to the fractionator system which is heated to provide a stream of a first light fraction and a stream of a first heavy fraction, and the stream of the first heavy fraction is chilled and then directed to the railcar.

In any of the methods or apparatus disclosed herein the method may be a batch method in which the first light fraction is heated in a fractionator system to provide a second light fraction and a second heavy fraction.

4. Specific Embodiments in FIG. 1

The drawings presented herein are for illustrative purposes only and are not intended to limit the scope of the claims. Rather, the drawings are intended to help enable one having ordinary skill in the art to make and use the claimed inventions.

FIG. 1 shows an illustrative flow chart, which is merely an example of the various methods and apparatus (which may also be referred to as systems or devices) disclosed herein. In FIG. 1, most of the various structures that may be part of the apparatus, and used in the method, are represented by boxes and arrows. Generally, unless otherwise specified, the arrows refer to conduits, e.g., pipes through which liquids flow, and may also include valves (not shown) and other conventional structures associated with transferring hydrocarbons, e.g., flow-meters and the like. A pipeline terminal 10 is provided which includes the downstream portion contains a low-viscosity bitumen composition (e.g., dilbit) which in FIG. 1 is a dilbit. A wide range of low-viscosity bitumen compositions (e.g., dilbits) are contemplated but all necessarily have at least three characteristics. First, they include bitumen. Second, they include diluent, which has been mixed with the bitumen to form the composition prior to being introduced to the pipeline, preferably being in the form of a miscible mixture that is also preferably homogenous having a single phase. Third, those compositions have a viscosity that is sufficiently low to flow easily through the pipeline. The viscosity of that composition at 15° C. (60° F.) may range, for example, from a low of 3.0, 5.0, 10.0, 20.0, or 30.0 cSt, to a high of 80.0, 100.0, 150.0, 200.0, or 230.0 cSt. Also, the low-viscosity bitumen compositions may have a wide range of densities, but they preferably range from a low of 800, 810, 820, 830, or 840 kg/m$^3$, to a high of 860, 870, 880, 890, 900, 950 or 1050 kg/m$^3$.

Feed conduit 12 is provided, through which the dilbit composition flows from the pipeline terminal to the dilbit tank 14, which may be one or multiple tanks for holding the dilbit. Conduit 16 is provided through which dilbit composition flows from the tank(s) to the fractionator 18. Conduit 20 is provided through which heavy fraction flows to holding tank 22 for the high-viscosity bitumen composition. Conduit 24 is provided through which the high viscosity bitumen composition (preferably the same as the heavy fraction) flows to a facility 26 that contains a chiller, e.g., any conventional device that is capable of removing heat from the bitumen composition via a vapor-compression or absorption refrigeration cycle. Facility 26 also includes conventional transfer pumps and metering for the material passing through the facility. Conduit 28 is provided through which the high-viscosity non-hazardous bitumen composition flows to rail loading terminal 30, which can be any conventional terminal capable of transferring hydrocarbons, e.g., bitumen compositions, to railcars. Conduit 33 is provided through which the light fraction, which in certain cases is also referred to as the overheads, flows from fractionator 18 to light fraction tank 34. Conduit 35 is provided through which the light fraction flows from tank 34 to light fraction facility 36, which includes loading pumps and metering equipment. Conduit 38 is provided through which light fraction materials flow to terminal 40, which can be a terminal either for loading light fraction materials onto trucks, e.g., tanker trucks, or for passing such materials to a separate pipeline.

In certain specific embodiments all, some, or a substantial part of the cooling of the high-viscosity bitumen composition is accomplished in fractionator 18 by cross-heat exchange with the incoming low-viscosity bitumen composition feed. Advantageously, the amount of heat removed from the high-viscosity bitumen composition can be put into the incoming low-viscosity bitumen feed to reduce the load or capacity of the fired heater and thus reduce emissions of the overall system. Also, in certain specific embodiments, light fraction can be transferred directly to trucks for shipping, alternately from tank 34 or tank 36.

Railway 42 is represented, illustrating the structure over which the railcars travel. Conduit 44 is provided through which high-viscosity non-hazardous bitumen composition may flow to unloading terminal 46. Conduit 48 is provided through which the high-viscosity composition flows to unloading terminal 46 and then through conduit 48 to tank(s) 50 where the material is stored for a desired period of time. Conduit 52 is provided through which the composition may flow to one or more terminals for further transportation, storage, and/or processing. Conduit 54 is provided through which the composition may flow to blending tank 60. Conduit 62 is provided through which composition may flow directly to a refinery or a truck to transport to a refinery. Conduit 56 is provided through which high-viscosity non-hazardous bitumen composition may flow to mixing tank 58 containing light crude blend stock. Conduit 59 is provided through which the mixture of the light crude blend stock and high-viscosity non-hazardous bitumen composition may flow to blending tank 60. Material may flow in either direction through conduit 64 between conduit 58 and conduit 62. Conduit 66 is provided through which flows the mixture from blending tank 60 to marine dock 68. The mixture may be transferred via conduit 72 to a ship, and/or all or some portion of the mixture may be transferred via conduit 70 back to be combined with the mixture leaving toward the refineries.

5. Examples

A sample of Suncor Cold Lake dilbit (CLD) was obtained from storage tank inventory and evaluated for physical properties, including light ends composition and extended liquid hydrocarbon atmospheric analysis. To simulate one or more of the methods described herein, a pot still distillation apparatus was operated over a predetermined series of runs under atmospheric conditions to strip out specific light ends from the dilbit at successively higher boiling points (FBP ranging from 50° C. to 160° C.). The resulting heavy fractions were then tested for Flash Point and Initial Boiling Point using ASTM methodology as discussed below.

Results substantiated that by removing from the CLD dilbit sample the particular light ends with boiling points (FBP) ranging up to 160° C., the resulting heavy fraction had an Initial Boiling Point (IBP) of 234.8° C. (using ASTM D86) and Flash Points of 103° C. and 113° C. (using ASTM D93 and ASTM D3828 methods, respectively).

The analytical method used for the determination of IBP herein was ASTM D86, entitled "Standard Test Method for Distillation of Petroleum Products at Atmospheric Pressure." Flash Point was determined by the closed cup method ASTM D3828, entitled "Standard Test Methods for Flash Point by Small Scale Closed Cup Tester." The CLD sample was also tested for certain baseline physical properties, as described below.

Specific predetermined distillation temperatures resulted in a range of properties for the resulting heavy fractions, including Initial Boiling Point and Flash Point. Specifically, a 40-liter CLD sample was used for testing. Individual heavy fraction samples were produced from the 40-liter CLD sample by removing light-ends components from the CLD dilbit using a series of atmospheric distillations in accordance with ASTM D5236. Ten different heavy fractions were obtained by distilling the CLD over a set of final boiling points (FBPs), namely: 50° C., 60° C., 70° C., 80° C., 100° C., 120° C., 130° C., 140° C., 150° C. and 160° C.

Before being subjected to fractionation (distillation) the CLD dilbit sample was tested for: certain oil properties (a "standard heavy oil package"); a light-ends analysis (C1-C10); an extended liquid hydrocarbon analysis, i.e., RVP using the ASTM D6377 method; and Flash Point (SETA using the closed-cup ASTM D3828 method).

After fractionation, the compositional data of the resulting light ends were subjected to mathematical recombination in which light ends were analyzed by C30+ and heavy ends were analyzed by C100, which included a CONA atmospheric condensate analysis, a C100 hydrocarbon scan and a relative density at 15° C. determination The Standard Conventional Crude Oil Package (ORTN) included measurement of D86 Distillation, S&W, pour point, relative density, API gravity, absolute density, six-point viscosity, and total Sulphur content.

ASTM D5236, entitled, "Standard Test Method for Distillation of Heavy Hydrocarbon Mixtures (Vacuum Pot Still Method)" is a test method that generally specifies a particular procedure often used for distillation of heavy hydrocarbon mixtures, such as heavy crude oils, petroleum distillates, residues, and synthetic mixtures. It specifies a pot still apparatus that includes a low pressure-drop entrainment separator operated at total takeoff conditions. A modified version of that ASTM D5236 test method was used in which atmospheric conditions were used instead of the specified conditions.

ASTM D86, entitled, "Standard Test Method for Distillation of Petroleum Products at Atmospheric Pressure," is a test method that generally specifies a particular procedure for single plate, atmospheric distillation of petroleum products using a laboratory batch distillation unit to determine quantitatively certain boiling range characteristics. The initial boiling point (IBP) is a corrected thermometer reading that is observed at the instant the first drop of condensate falls from the lower end of the condenser tube.

ASTM D6377, entitled "Standard Test Method for Determination of Vapor Pressure of Crude Oil: VPCRx (Expansion Method)," is a test method that that generally specifies a particular procedure for using automated vapor pressure instruments to determine the vapor pressure of crude oils at temperatures between 5 and 80° C. for vapor-liquid ratios from 4:1 to 0.02:1 and pressures from 7 to 500 kPa. Employing a measuring chamber with a built-in piston, a sample of known volume is drawn from a pressurized cylinder into the temperature-controlled chamber at 20° C. or higher. After sealing the chamber, the volume is expanded by moving the piston until the final volume produces the desired V/L value. After temperature and pressure equilibrium, the measured pressure is recorded as the VPCRx of the sample. The test specimen is to be mixed during the measuring procedure by shaking the measuring chamber to achieve pressure equilibrium in a reasonable time between 5 and 30 min.

ASTM D3828, entitled "Standard Test Methods for Flash Point by Small Scale Closed Cup Tester," is a test method that that generally specifies a particular procedure for the determination of the flash point by a small scale closed tester. The procedures may be used to determine the actual flash point temperature of a sample or whether a product will or will not flash at a specified temperature (flash/no flash). The applicable FP range for this method is –30° C. to 300° C. For the purpose of PG assignment, it is considered sufficient to report pass/fail outcome at 23° C.

ASTM D93, entitled "Standard Test Methods for Flash Point by Pensky-Martens Closed Cup Tester," is a test method that generally specifies a particular procedure for the determination of the flash point of petroleum products in the temperature range from 40 to 360° C. by a manual Pensky-Martens closed-cup apparatus or an automated Pensky-Martens closed-cup apparatus.

OLEA10 is a Light-Ends Analysis using GC from C1 to C10. The 160° C. FBP fraction is removed using an ASTM D5236 pot still distillation. Table 1 below shows a summary of certain physical properties of the CLD dilbit prior to the distillation.

TABLE 1

Summary of Suncor Cold Lake Dilbit (CLD) Physical Properties
Suncor Cold Lake/Tank at Hardisty

| | |
|---|---|
| Absolute Density @15° C. (ASTM D5002) | 934.5 kg/m³ |
| Flash Point (ASTM D3828) | <–20° C. |
| Initial Boiling Point (ASTM D86) | 38.4° C. |
| Sulfur Content (ASTM D4294) | 3.97 mass % |
| Pour Point (ASTM D97) | –30° C. |
| Total sediment & water (ASTM D4007) | 0.450 vol % |
| Viscosity at 15° C. (Brookfield) | 459 cP |
| Viscosity at 20° C. (Brookfield) | 323 cP |
| Viscosity at 25° C. (Brookfield) | 233 cP |
| Viscosity at 30° C. (Brookfield) | 170 cP |
| Viscosity at 40° C. (Brookfield) | 98 cP |
| Viscosity at 50° C. (Brookfield) | 60 cP |
| Total Light Ends $C_1$ to $C_{10}$ | 6.34 mass % |
| Vapor Pressure (ASTM D6377) | 31.3 kPa |

Table 3 shows a summary of Initial Boiling Point (IBP) and Flash Point (FP) results for the original CLD dilbit sample as well as for the heavy fractions obtained using Pot Still Distillation method ASTM D5236.

TABLE 3

Summary of IBP and FP determination

| Sample | Laboratory ID/LIMS sample number | IBP by ASTM D86 [° C.] | Flash Point ASTM D3828 [° C.] | Flash Point ASTM D938 [° C.] | PG |
|---|---|---|---|---|---|
| CLD Dilbit | Original KT8181 | 38.4 | <–20 | | L1 |
| Heavy Fraction (FBP = 50° C.) | 50 + KT8204 | 43.8 | <–20 | | L1 |
| Heavy Fraction (FBP = 60° C.) | 60 + KT8205 | 51.9 | –10 | | L1 |
| Heavy Fraction (FBP= 70° C.) | 70 + K58206 | 73 | 10.5 | | L1 |
| Heavy Fraction (FBP = 80° C.) | 80 + KT8207 | 84.9 | 24.5 | | L11 |
| Heavy Fraction (FBP = 100° C.) | 100 + KT8208 | 107.3 | 39 | | L11 |
| Heavy Fraction (FBP = 120° C.) | 120 + KW3174 | 135.4 | 58 | | L11 |
| Heavy Fraction (FBP = 130° C.) | 130 + KX6426 | n/a | 85 | | |
| Heavy Fraction (FBP = 140° C.) | 140 + KY7472 | n/a | 91 | 79 | |
| Heavy Fraction (FBP = 150° C.) | 150 + (tryout) | n/a | n/a | 91 | |
| Heavy Fraction (FBP = 160° C.) | 160 + KZ0669 | 234.8 | 113 | 103 | |

Figure 2:
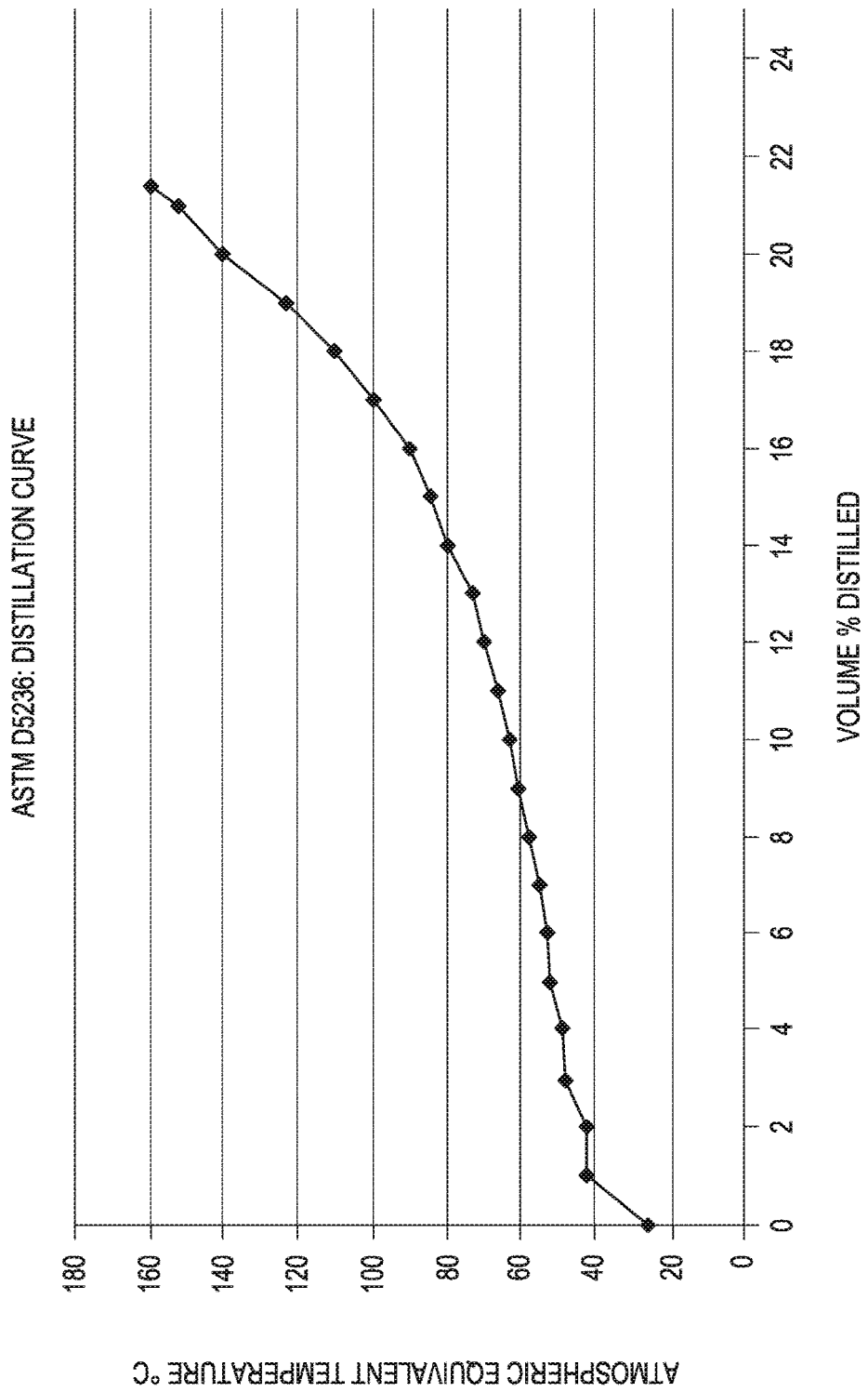
FIG. 2 shows Atmospheric Equivalent Temperature plotted against volume % of recovered distillate for a Pot Still Distillation at atmospheric conditions for a selected 160° C. FBP fraction.

FIG. 2 shows data for a Pot Still Distillation at atmospheric conditions for the 160° C. FBP fraction, specifically, Atmospheric Equivalent Temperature (AET) plotted against volume % of the recovered distillate.

Figure 3:
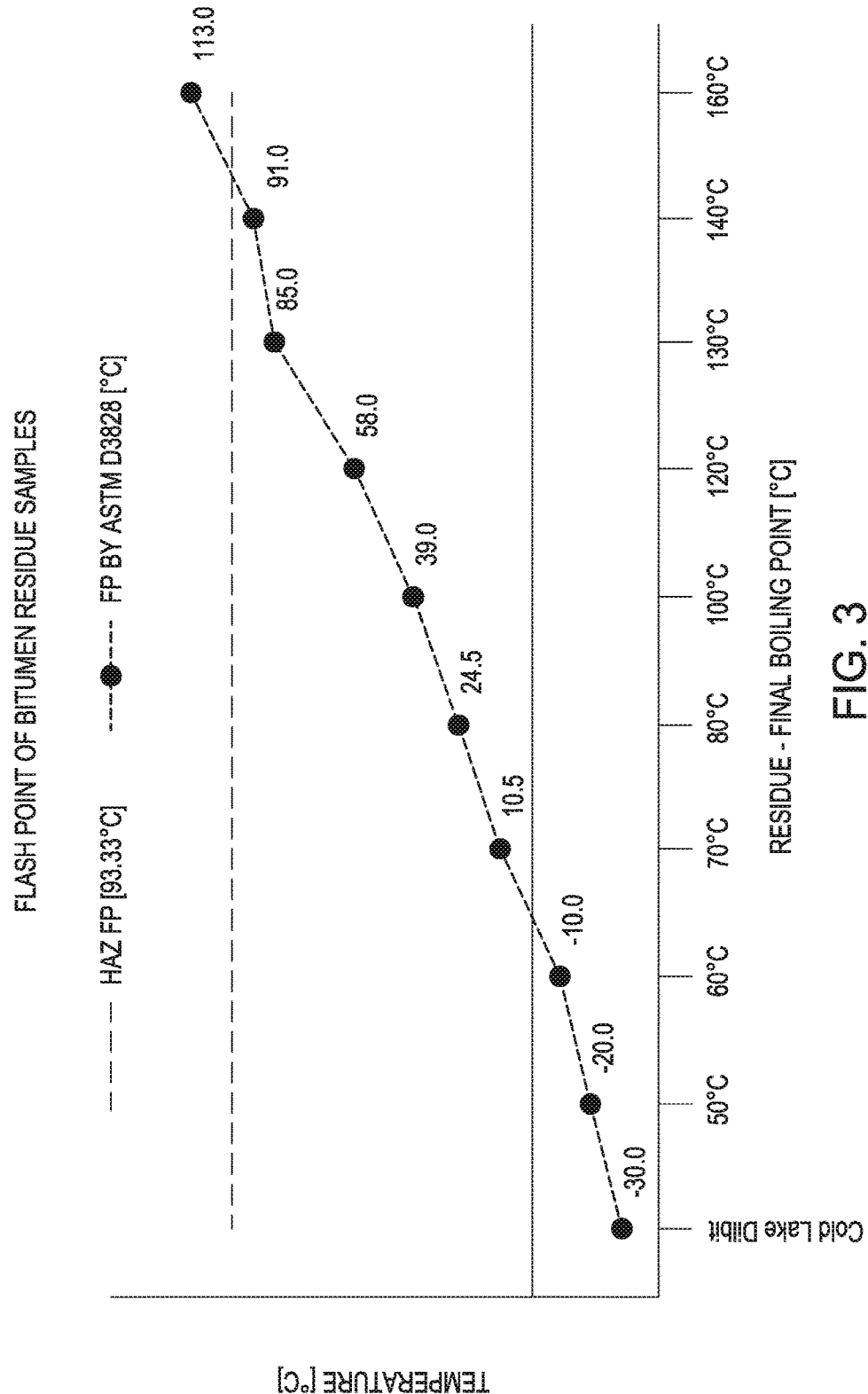
FIG. 3 is a plot showing different flash points of different bitumen residue samples (heavy fractions).
Figure 4:
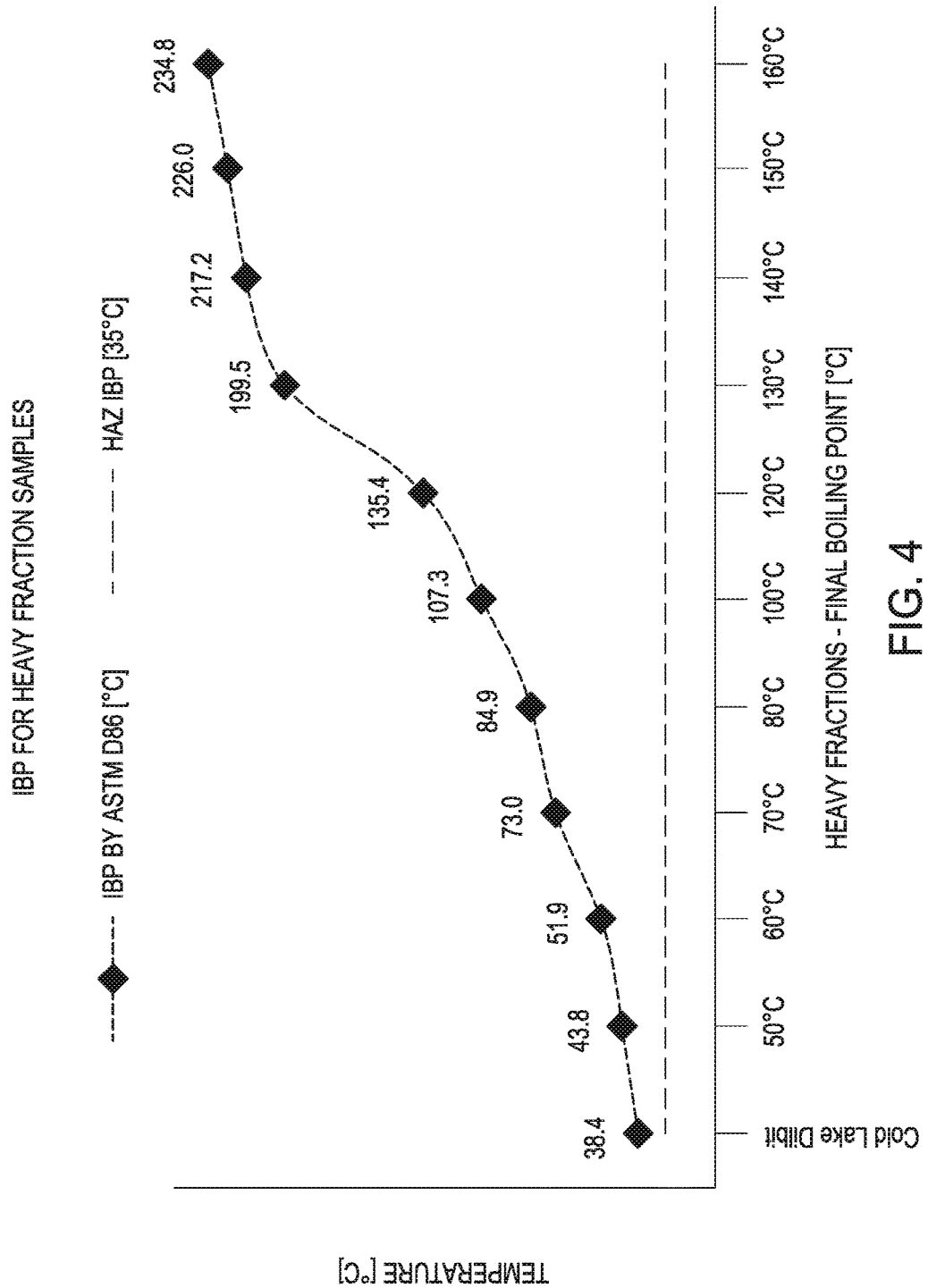
FIG. 4 is a plot showing different Initial Boiling Points of different bitumen residue samples (heavy fractions).
Figure 5:
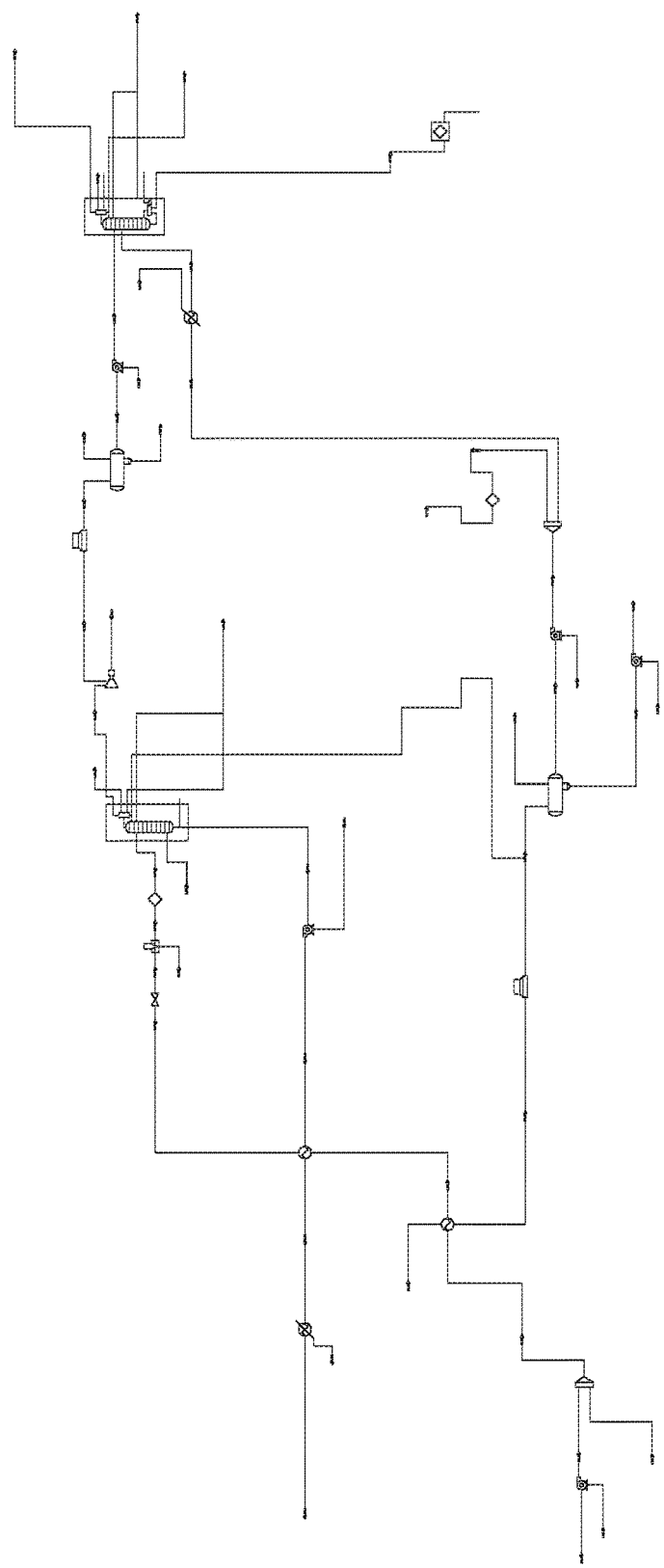
FIG. 5 is a flow chart of a process using a stabilizer and flashpoint of 235 degrees F.
Figure 7:
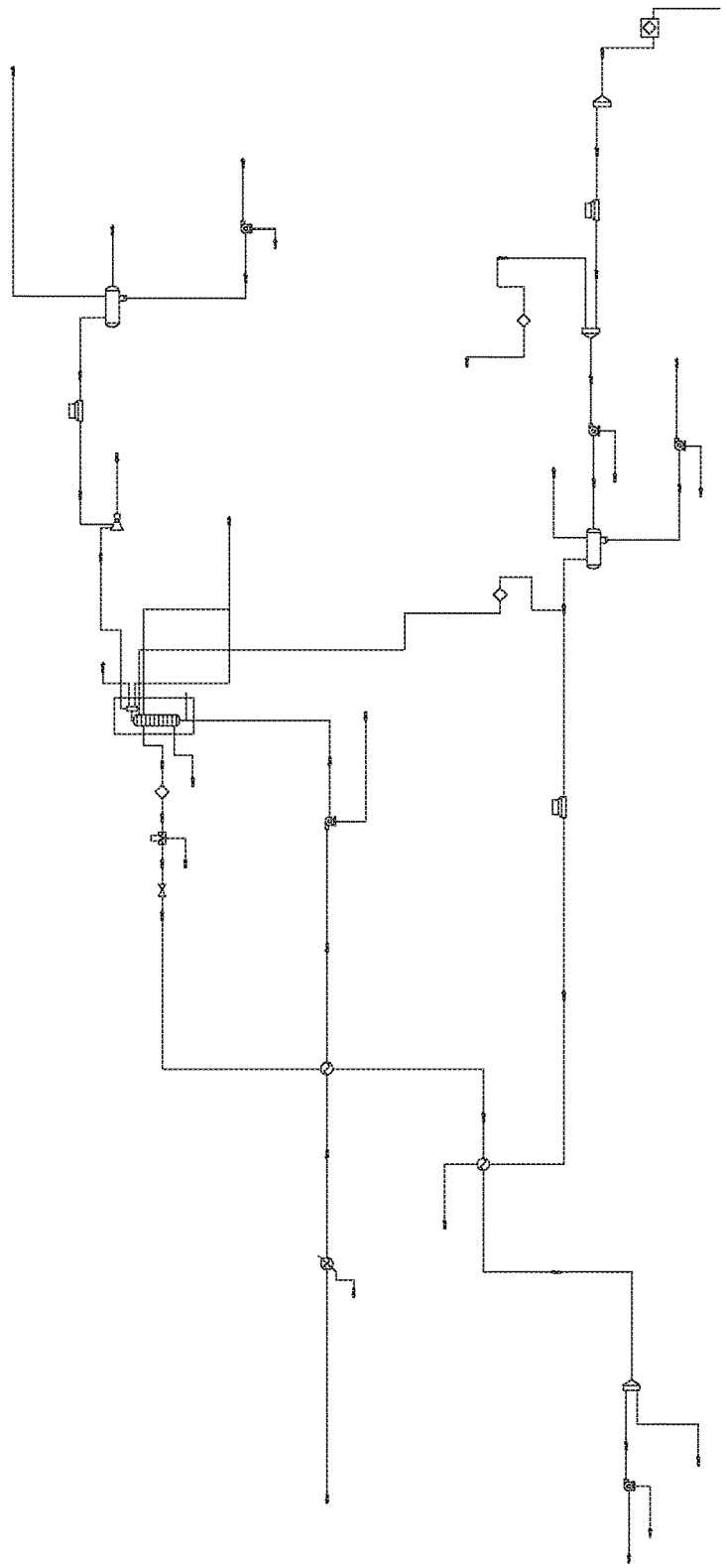
FIG. 7 is a flow chart of a process using a flashpoint of 210 degrees F. without a stabilizer.
Figure 9:
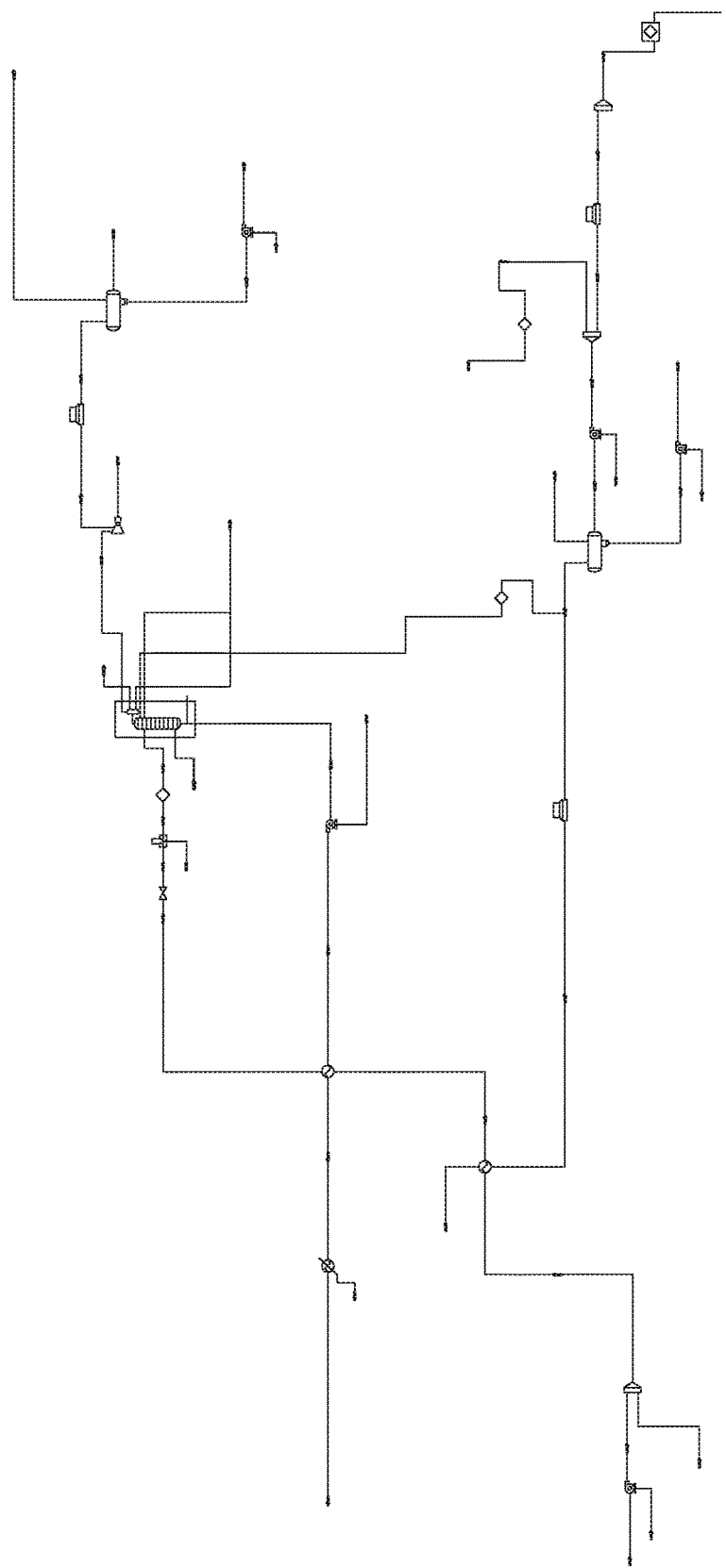
FIG. 9 is a flow chart of a process using a flashpoint of 235 degrees F. without a stabilizer.

Certain measured properties of the different heavy fractions collected are presented in FIGS. 3 and 4. The measured data demonstrated that by removing the light end fractions of the Suncor Cold Lake dilbit (CLD) with boiling points up to 160° C./320° F., the resulting heavy fraction had an initial boiling point (IBP) of 234.8° C./454.6° F. (using ASTM D86) and flash points of 103° C./217.4° F. and 113° C./235.4° F. (by methods ASTM D93 and ASTM D3828, respectively).

What is claimed is:

1. A method, comprising:
   receiving, in a first tank and from a first pipeline terminal, a low-viscosity bitumen composition,
      wherein the low-viscosity bitumen composition has a first viscosity and comprises bitumen and a diluent, and
      wherein the low-viscosity bitumen composition is in the form of a miscible mixture, the miscible mixture being homogenous and having a single phase;
   pre-heating, using a first heat exchanger in fluid communication with the first tank, the low-viscosity bitumen composition;
   pre-heating, using a second heat exchanger in fluid communication with the first heat exchanger, the low-viscosity bitumen composition;
   separating, using a fractionator in fluid communication with the second heat exchanger, the pre-heated low-viscosity bitumen composition into:
      a first heavy fraction having a first temperature, and
      a first light fraction having a second temperature that is greater than the first temperature and thus the first temperature of the first heavy fraction is less than the second temperature of the first light fraction, wherein separating the pre-heated low-viscosity bitumen composition into the first heavy fraction and the first light fraction comprises:
  heating, using a fired heater, the pre-heated low-viscosity bitumen composition to a maximum temperature at atmospheric pressure;
  wherein the use of the first heat exchanger to pre-heat the low-viscosity bitumen composition reduces an amount of fuel required for the fired heater to heat the pre-heated low-viscosity bitumen composition to the maximum temperature at atmospheric pressure at the step of separating the pre-heated low-viscosity bitumen composition into the first heavy fraction and the first light fraction,
  and
  wherein the use of the second heat exchanger to pre-heat the low-viscosity bitumen composition also reduces the amount of fuel required for the fired heater to heat the pre-heated low-viscosity bitumen composition to the maximum temperature at atmospheric pressure at the step of separating the pre-heated low-viscosity bitumen composition into the first heavy fraction and the first light fraction;
lowering, using the first heat exchanger, the first temperature of the first heavy fraction;
lowering, using the second heat exchanger, the second temperature of the first light fraction;
receiving, in a second tank in fluid communication with the fractionator, the first light fraction;
separating, using a stabilizer in fluid communication with the second tank, the first light fraction into:
  a second heavy fraction, which is or includes liquid, and
  a second light fraction, which is or includes off-gas;
pumping, using at least one loading pump in fluid communication with the second tank, at least the second heavy fraction of the first light fraction to a second pipeline terminal or a truck terminal;
receiving, in a third tank in fluid communication with the fractionator, the first heavy fraction,
  wherein the first heavy fraction is or forms a high-viscosity bitumen composition having a second viscosity that is higher than the first viscosity of the low-viscosity bitumen composition;
cooling the high-viscosity bitumen composition;
pumping, using at least one transfer pump, the high-viscosity bitumen composition to a rail loading terminal;
directing the high-viscosity bitumen composition to a railcar at the rail loading terminal;
and
transporting, using the railcar and a railway over which the railcar travels, the high-viscosity bitumen composition;
  wherein the low-viscosity bitumen composition is pre-heated using the first heat exchanger, with which the first temperature of the first heavy fraction is lowered, before the low-viscosity bitumen composition is pre-heated using the second heat exchanger, with which the second temperature of the first light fraction is lowered;
  wherein the high-viscosity bitumen composition is cooled at the step of cooling so that:
    the temperature of the high-viscosity bitumen composition is 100 degrees Celsius or below at the step of directing the high-viscosity bitumen composition to the railcar at the rail loading terminal; and
    the temperature of the high-viscosity bitumen composition does not exceed 100 degrees Celsius during the step of transporting the high-viscosity bitumen composition using the railcar and the railway over which the railcar travels;
  wherein, during the step of transporting the high-viscosity bitumen composition using the railcar and the railway, the high-viscosity bitumen composition has:
    a flash point of greater than or equal to 93 degrees Celsius;
    and
    at least two volume percent of components from the diluent of the low-viscosity bitumen composition;
  wherein the first heat exchanger uses cross-flow heat exchange to:
    lower the first temperature of the first heavy fraction at the step of lowering the first temperature of the first heavy fraction using the first heat exchanger; and
    pre-heat the low-viscosity bitumen composition at the step of pre-heating the low-viscosity bitumen composition using the first heat exchanger;
  and
  wherein the second heat exchanger uses cross-flow heat exchange to:
    lower the second temperature of the first light fraction at the step of lowering the second temperature of the first light fraction using the second heat exchanger; and
    pre-heat the low-viscosity bitumen composition at the step of pre-heating the low-viscosity bitumen composition using the second heat exchanger.

2. The method of claim 1, wherein the first heat exchanger comprises a shell-and-tube heat exchanger.

3. The method of claim 1, wherein the second heat exchanger comprises a shell-and-tube heat exchanger.

4. The method of claim 1, wherein each of the first and second heat exchangers comprises a shell-and-tube heat exchanger.

5. The method of claim 1, wherein the fractionator comprises the fired heater.

6. The method of claim 1, wherein the fractionator comprises a first atmospheric separation tower.

7. The method of claim 6,
  wherein the fractionator further comprises a second atmospheric separation tower; and
  wherein the first and second atmospheric separation towers operate in parallel with one another.

8. The method of claim 7, wherein each of the first and second atmospheric separation towers comprises:
  an input conduit through which at least a portion of the pre-heated low-viscosity bitumen composition flows; and
  an output conduit through which at least a portion of the first heavy fraction flows.

9. The method of claim 1, wherein the at least one loading pump is fluidically positioned between the second tank and the stabilizer.

10. The method of claim 1, wherein the maximum temperature to which the pre-heated low-viscosity bitumen composition is heated at atmospheric pressure is 450 degrees Fahrenheit.

11. The method of claim 1, wherein cooling the high-viscosity bitumen composition comprises:
    removing, using a chiller in fluid communication with the third tank, heat from the high-viscosity bitumen composition.

12. The method of claim 11, wherein the chiller comprises a third heat exchanger.

13. The method of claim 12, wherein the third heat exchanger comprises a shell-and-tube heat exchanger.

14. The method of claim 11, wherein the chiller comprises a device adapted to remove heat from the high-viscosity bitumen composition via a vapor-compression or absorption refrigeration cycle.

\* \* \* \* \*